US007363177B2

(12) United States Patent
Intrator et al.

(10) Patent No.: US 7,363,177 B2
(45) Date of Patent: Apr. 22, 2008

(54) APPARATUS AND METHOD FOR PERFORMING THE TIME DELAY ESTIMATION OF SIGNALS PROPAGATING THROUGH AN ENVIRONMENT

(75) Inventors: Nathan Intrator, Providence, RI (US); Ki-o Kim, Providence, RI (US); Nicola Neretti, Jamaica Plain, MA (US); Leon N. Cooper, Providence, RI (US)

(73) Assignee: Brown University, Providence, RI (US)

( * ) Notice: Subject to any disclaimer, the term of this patent is extended or adjusted under 35 U.S.C. 154(b) by 112 days.

(21) Appl. No.: 10/567,887

(22) PCT Filed: Aug. 5, 2004

(86) PCT No.: PCT/US2004/025373

§ 371 (c)(1),
(2), (4) Date: Feb. 9, 2006

(87) PCT Pub. No.: WO2005/015254

PCT Pub. Date: Feb. 17, 2005

(65) Prior Publication Data

US 2006/0235635 A1    Oct. 19, 2006

Related U.S. Application Data

(60) Provisional application No. 60/494,358, filed on Aug. 12, 2003.

(51) Int. Cl.
*G01R 29/02* (2006.01)
(52) U.S. Cl. ...................................................... 702/79
(58) Field of Classification Search .................. 702/79, 702/176, 125; 367/103, 125
See application file for complete search history.

(56) References Cited

U.S. PATENT DOCUMENTS

| 3,681,747 | A | 8/1972 | Walsh | 340/3 R |
|---|---|---|---|---|
| 4,054,862 | A | 10/1977 | Backman, Jr. | 340/3 R |
| 4,847,817 | A | 7/1989 | Au et al. | 367/135 |
| 5,481,504 | A | 1/1996 | Rosenbach et al. | 367/101 |
| 5,581,620 | A | 12/1996 | Brandstein et al. | 381/92 |
| 5,889,490 | A | 3/1999 | Wachter et al. | 342/127 |
| 5,949,739 | A | 9/1999 | Reese | 367/100 |
| 6,539,320 | B1 | 3/2003 | Szajnowski et al. | 702/79 |
| 7,239,580 | B2* | 7/2007 | Intrator et al. | 367/101 |
| 7,289,388 | B2* | 10/2007 | Intrator et al. | 367/100 |
| 2006/0004287 | A1* | 1/2006 | Rigby et al. | 600/437 |
| 2007/0167802 | A1* | 7/2007 | Rigby et al. | 600/459 |

OTHER PUBLICATIONS

"Joint Estimation of Time Delay and Doppler Ratio from Broadband Data Using Discrete Estimation Techniques"; David Jaarsma et al.; Planning Systems Incorporation, IEEE 1991.

* cited by examiner

*Primary Examiner*—Michael Nghiem
(74) *Attorney, Agent, or Firm*—Weingarten, Schurgin, Gagnebin & Lebovici LLP

(57) ABSTRACT

A system and method for increasing the accuracy of time delay estimates of signals propagating through an environment. The system includes one or more sensors for receiving a plurality of signals, and a time delay estimator for measuring time delays between multiple pairs of signals. At least some of the multiple pairs of signals are received and measured at different points in time. The system further includes a data analyzer for analyzing time delay estimation data, for generating a statistical distribution of time delay estimates from the data, and for calculating a statistical estimate of time delay from the distribution. By increasing the number of signals employed by the system, the accuracy of the time delay estimation is increased. Further, by calculating the median or the mode of the statistical distribution, noise tolerance is improved.

44 Claims, 15 Drawing Sheets

APPARATUS AND METHOD FOR PERFORMING THE TIME DELAY ESTIMATION OF SIGNALS PROPAGATING THROUGH AN ENVIRONMENT

CROSS REFERENCE TO RELATED APPLICATIONS

This application claims priority of U.S. Provisional Patent Application No. 60/494,358 filed Aug. 12, 2003 entitled ECHO DELAY ESTIMATES FROM MULTIPLE SONAR PINGS.

STATEMENT REGARDING FEDERALLY SPONSORED RESEARCH OR DEVELOPMENT

This invention was made with government support under U.S. Government Contract Nos. ARO DAAD 19-02-1-0403 and ONR N00012-02-C-02960. The government has certain rights in the invention.

BACKGROUND OF THE INVENTION

The present application relates generally to signal processing, and more specifically to systems and methods of increasing the accuracy of time delay estimates of signals propagating through an environment.

Various industrial and scientific techniques require accurate estimations of time delays of signals propagating through an environment such as an underwater environment, a soil environment, or an environment comprising living tissue. For example, in an underwater environment, sonar systems may be employed to estimate time delays of sonar pulses reflected from an object or target to estimate a distance to the target (also known as estimating the range of the target). Conventional systems for performing sonar range estimation typically transmit one or more sonar pulses ("pings") comprising sonic or supersonic pressure waves toward a selected target, and receive one or more sonar pulses reflected from the target. Such reflected sonar pulses ("echoes" or "returns") may include a significant amount of background noise and/or other interfering signals in addition to the reflected sonar signals of interest. For example, a conventional sonar system may comprise a coherent receiver including a cross correlator configured to receive the echo and a representation of the transmitted sonar pulse or ping, which are cross-correlated within the coherent receiver to generate a peak cross correlation value. The conventional sonar system typically compares the peak cross correlation value to a predetermined threshold value. If the cross correlation value is greater than the predetermined threshold value, then the reflected sonar signal of interest has been successfully detected. The conventional sonar system may then utilize the cross correlation peak to obtain a measure of the range of the target.

One drawback of the above-described conventional sonar system is that the level of background noise and/or other interfering signals contained within the echo or return may be sufficient to cause the reflected sonar signal to go undetected or to be falsely detected, thereby causing the cross correlator to produce inaccurate range measurements. Such inaccurate range measurements are likely to occur in low signal-to-noise ratio (SNR) sonar environments, in which the noise power within the echo may be comparable to or greater than the reflected signal power. This can be problematic in sonar ranging systems because a reduction in the measurement accuracy of the cross correlator typically leads to a concomitant reduction in sonar ranging accuracy.

Prior attempts to increase the accuracy of sonar ranging have included filtering out at least some of the background noise before providing the echoes to the cross correlator. However, such attempts have generally not worked well enough to allow successful detection of reflected sonar signals and accurate estimation of range in low SNR sonar environments. This is due, at least in part, to the fact that sonar systems typically receive echoes that include various types of noise from a variety of different noise sources. For example, a sonar system may transmit pings through a medium such as water from a ship or submarine that produces noise across a wide frequency range. Further, other ships, submarines, or structures producing noise across wide frequency ranges may be within the vicinity of the sonar system. Moreover, the natural interaction of the water and objects within the water including the selected target may produce a substantial amount of ambient noise.

In addition, sonar ranging systems may receive echoes from multiple selected (and unselected) targets, each target having its own associated noise level, and it may be desirable to determine the noise level and range of each target separately. Such noise associated with multiple targets may be stationary or non-stationary, linear or nonlinear, or additive or non-additive. Further, at least some of the background noise may result from reverberations and/or random signal distortions of the ping and/or echo, and therefore the noise level and its structure may be significantly affected by the transmitted sonar signal. However, conventional sonar systems are generally incapable of accurately estimating noise levels and target ranges in the presence of non-stationary, nonlinear, non-additive, and/or signal-dependent noise.

Moreover, the density and temperature of the transmission medium (e.g., water) and the frequency of the transmitted/reflected sonar signals may affect the decay rate of the sonar pulse propagating through the medium. In addition, the absorption of certain frequencies of the ping by the target may affect the strength of the resulting echo. However, conventional sonar systems are generally incapable of fully compensating for such factors when called upon to generate accurate noise and range estimates.

It would therefore be desirable to have a system and method of increasing the accuracy of time delay estimates of signals propagating through an environment that avoids the drawbacks of the above-described systems and methods. Such a system would have increased resilience to noise, thereby allowing an increase in the operating range of the system and/or a decrease in the power level of signals employed by the system.

BRIEF SUMMARY OF THE INVENTION

In accordance with the present invention, a system and method are provided for increasing the accuracy of time delay estimates of signals propagating through an environment. The presently disclosed system and method achieve such increased accuracy in time delay estimation by employing multiple transmitted signals and/or multiple received signals. Further, in the event a degree of noise accompanies the received signals, at least some of the noise is non-correlated.

In one embodiment, the system includes one or more sensors for receiving a plurality of signals, and a time delay estimator for measuring time delays between multiple pairs of the plurality of signals, thereby generating time delay estimation data from the measured time delays. At least some of the multiple pairs of signals are received and measured at different points in time. The system further includes a data analyzer for analyzing the time delay estimation data, for generating a statistical distribution of the time delay estimates from the time delay estimation data, and for calculating at least one of the mean, the median, and the mode of the time delay estimation distribution. By increasing the number of signals employed by the system, the accuracy of the time delay estimation is increased. Further, by calculating the median or the mode of the distribution of time delay estimations, noise tolerance is improved. The plurality of signals may comprise one of sonar signals, seismic signals, ultrasonic signals, acoustic signals, electromagnetic signals, or any other suitable type of signals.

In another embodiment, the system and method employ an iterative process in which the distribution of time delay estimates is determined, and an initial statistical estimate of time delay is calculated from the distribution. Next, a first set of boundaries of the time delay estimation distribution is determined, and time delay estimates disposed outside of the first set of boundaries ("outliers") are removed from the distribution. The statistical estimate of time delay is then recalculated and compared to the initial statistical estimate. In the event the difference between the initial statistical estimate and the recalculated statistical estimate is greater than or equal to a predetermined threshold value, a next set of distribution boundaries is determined. Next, one or more additional outliers are removed from the distribution, and the statistical estimate of time delay is recalculated and compared to the prior statistical estimate. In the event the difference between the recalculated statistical estimate and the prior statistical estimate is less than the predetermined threshold value, the final statistical estimate is used to increase the accuracy of time delay estimation. In alternative embodiments, the statistical estimate of time delay comprises the mean, the median, or the mode of the distribution of time delay estimations.

In general, the mean of a distribution of multiple observations is obtained by multiplying the value of each observation by its probability and summing the resulting products. In general, the median of a distribution of multiple observations is obtained by ranking the values of the observations in order from smallest to largest and taking the central value. In general, the mode of a distribution of multiple observations is obtained by taking the most frequent value of the observations.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIG. 1b is a block diagram of an alternative embodiment of the system of FIG. 1a;

FIG. 4 is a flow diagram illustrating a method of operating a first embodiment of the system of FIG. 1a;

FIG. 5a is a diagram illustrating characteristics of one of multiple pings transmittable by the system of FIG. 1a;

FIG. 5b is a diagram illustrating characteristics of successive echoes resulting from the ping of FIG. 5a;

FIGS. 6a-6c are diagrams illustrating the successive echoes of FIG. 5b after being preprocessed by a signal processor included in the system of FIG. 1a;

FIG. 10b is a diagram illustrating the probability of selecting a given bin in the cross correlation function of FIG. 10a;

FIG. 11b is a diagram illustrating the probability of selecting a given bin in the cross correlation function of FIG. 11a;

FIGS. 13a-13d are diagrams of simulated distributions of echo delay estimates for different noise levels in the environment of FIG. 1a;

DETAILED DESCRIPTION OF THE INVENTION

U.S. Provisional Patent Application No. 60/494,358 filed Aug. 12, 2003 entitled ECHO DELAY ESTIMATES FROM MULTIPLE SONAR PINGS is incorporated herein by reference.

Systems and methods are disclosed for increasing the accuracy of time delay estimates of signals propagating through an environment. The presently disclosed system and method increase time delay estimation accuracy by using time delay estimates generated from multiple signals including varying levels of non-correlated noise to form a statistical distribution of the time delay estimates. In one embodiment, the system and method employ an iterative process in which multiple signals are preprocessed, a distribution of time delay estimates of the signals is determined, and the mean of the distribution is calculated. In alternative embodiments, the median or the mode of the distribution of time delay estimates is calculated. By calculating the mean, the median, or the mode of a distribution of time delay estimates, information from multiple signals may be employed to increase the accuracy of the time delay estimation. In addition, by calculating the median or the mode of the distribution of time delay estimates, the accuracy of time delay estimation is increased while improving the noise tolerance of the system.

Figure 1A:
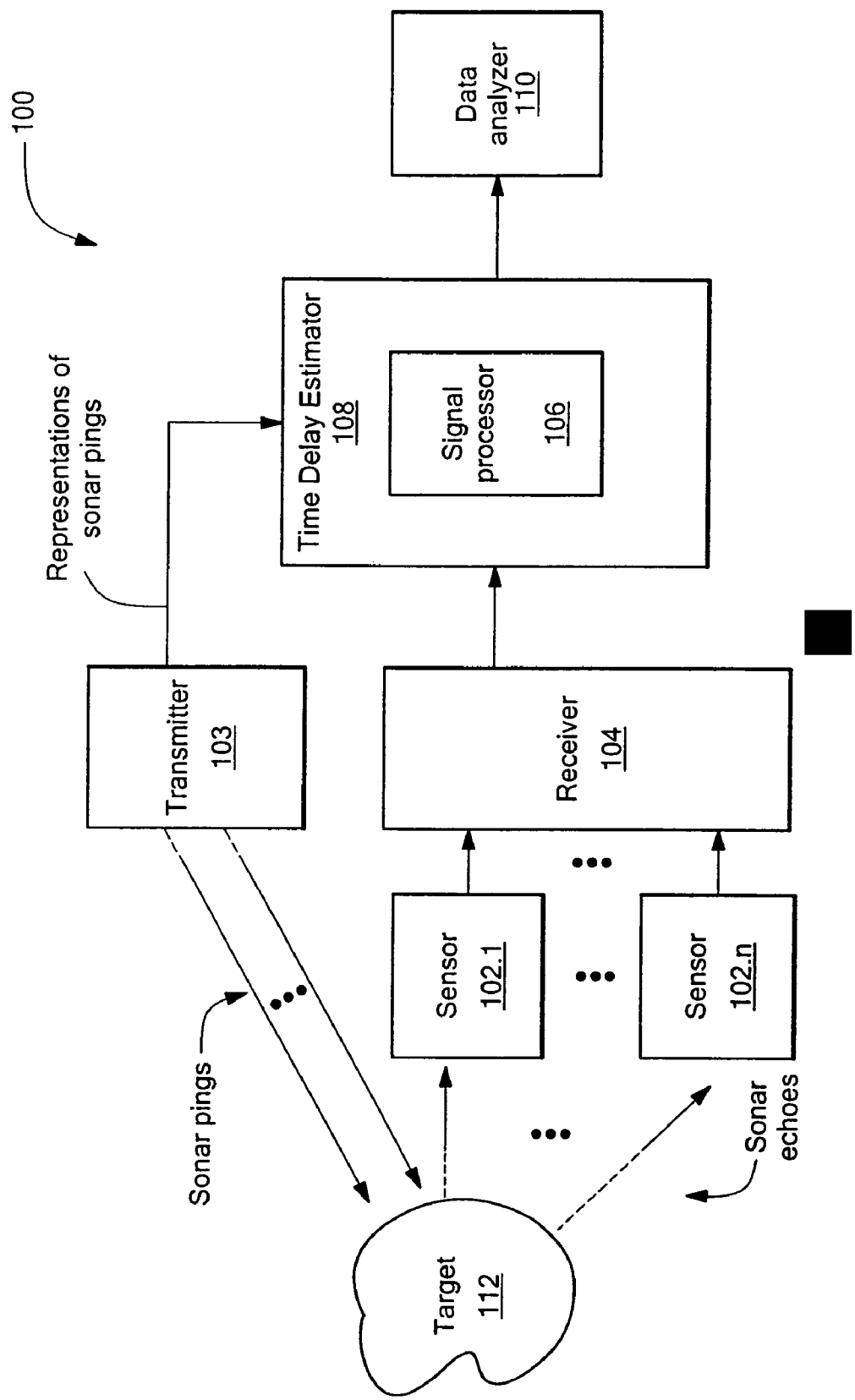
FIG. 1a is a block diagram of a system for performing time delay estimation of signals propagating through an environment according to the present invention.

FIG. 1a depicts an illustrative embodiment of a system 100 for estimating time delays of signals propagating through an environment, in accordance with the present invention. In the illustrated embodiment, the system 100 includes one or more sensors 102.1-102.n, a transmitter 103, a receiver 104, a time delay estimator 108 including a signal processor 106, and a data analyzer 110. It is noted that the illustrative embodiment of the system 100 described herein is suitable for performing time delay estimation in (1) a fluid environment, e.g., an air environment, or an underwater environment for marine exploration, (2) an earth environment for seismic exploration, (3) an environment comprising living tissue for medical ultrasound, or any other suitable environment. The signals propagating through the various environments may therefore comprise sonar signals, seismic signals, ultrasonic signals, acoustic signals, electromagnetic signals, or any other suitable type of signals. It should also be understood that the presently disclosed system 100 may be adapted for use in radar systems, microwave systems, laser systems, or any other suitable system.

In the presently disclosed embodiment, the transmitter 103 is configured to transmit one or more sonar pulses ("pings") through a transmission medium such as water. The pings travel through the water until they strike an object or target 112 in the water, which returns one or more reflected sonar pulses ("echoes" or "returns") toward the sonar sensors 102.1-102.n. For example, the sonar sensors 102.1-102.n may comprise one or more hydrophone sensors. Each one of the sensors 102.1-102.n is configured to sense the echoes, and to provide signals representative of the echoes to the sonar receiver 104. In turn, the receiver 104 provides indications of the echoes to the time delay estimator 108.

In the illustrated embodiment, the time delay estimator 108 receives the echo indications from the receiver 104, and receives representations of the pings transmitted by the sonar transmitter 103. For example, the time delay estimator 108 may comprise a cross correlator, or any other suitable device or technique for estimating the time delay of signals. In the presently disclosed embodiment, the time delay estimator 108 comprises a cross correlator, which is configured to perform multiple cross correlation operations on the echoes and pings. Specifically, the time delay estimator 108 cross-correlates each echo/ping pair, and provides cross correlation output data to the data analyzer 110, which is operative to analyze the data to make multiple echo delay estimates by determining the variability of cross correlation peaks, and to generate a distribution of the echo delay estimates. The preprocessing of the echoes and the generation of the echo delay estimation distributions are described below. It should be understood that the system 100 may comprise an active system capable of estimating time delays of signals using multiple transmitted signal/return signal pairs, or a passive system capable of estimating time delays using successive received signals. In the event the system 100 comprises a passive system, the transmitter 103 may be removed from the system.

Figure 2A:
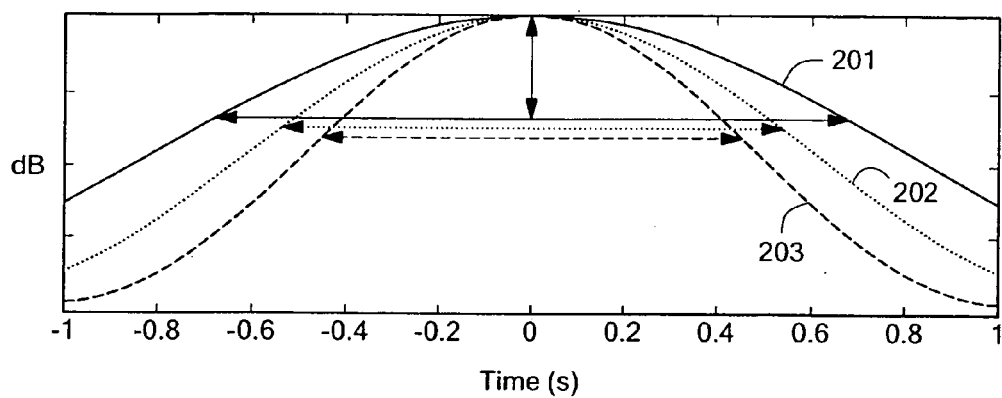
FIGS. 2a-2b are diagrams of ambiguity functions illustrating the effect of noise level on the variability of cross correlation peaks.
Figure 2B:
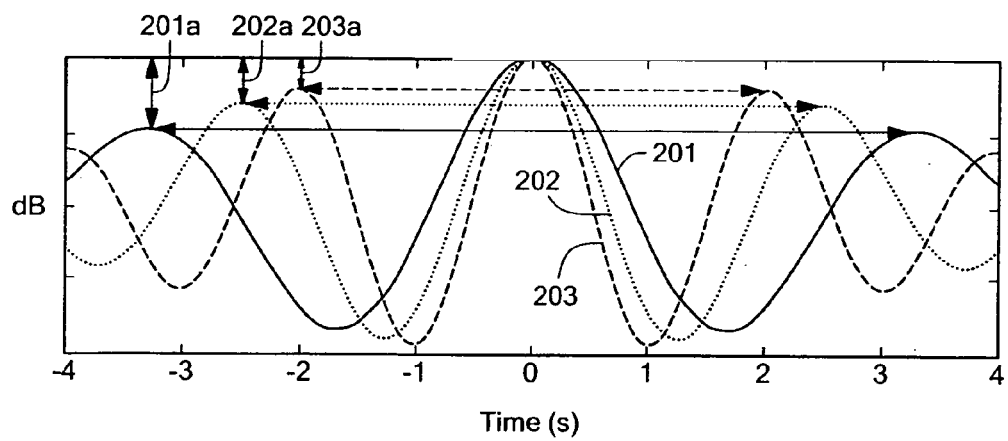

The operation of the presently disclosed sonar system 100 will be better understood by reference to the following analysis. In general, the cross correlation of an echo and a ping may be expressed as $$\psi_e \cdot \psi_p(\tau) = \int \psi_e(t)\psi_p(t+\tau)\,dt \Rightarrow \quad (1)$$

$$= \int \psi_p(t)\psi_p(t+\tau+\tau_0)\,dt + \int \psi_p(t)\eta(t+\tau)\,dt,$$

in which the first term "$\int \psi_p(t)\psi_p(t+\tau+\tau_0)dt$" is the auto-correlation of the ping centered at time $\tau_0$ (e.g., $\tau_0=0$), the second term "$\int \psi_p(t)\eta(t+\tau)dt$" is representative of band-limited white noise with frequency limits defined by the spectrum of the ping, and the integration operation in each term is performed from $-\infty$ to $+\infty$. FIGS. 2a-2b depict representative ambiguity functions 201-203 that may be employed to describe the output provided by the time delay estimator 108 (see FIG. 1a) comprising a cross correlator. Because the cross correlator operates on pairs of echoes and pings, it is understood that an ambiguity function may be constructed corresponding to each echo/ping pair.

As shown in FIGS. 2a-2b, the ambiguity functions 201-203 are expressed as functions of sonar pulse amplitude (vertical axis, dB) and delay time (horizontal axis, seconds), which is proportional to sonar range in a sonar ranging system. Specifically, the ambiguity functions 201-203 correspond to the cross correlation of respective echo/ping pairs having approximately the same frequency range but different center frequency fc (i.e., mean integrated frequency). For example, the ambiguity function 201 corresponds to the cross correlation of a first echo/ping pair having a low center frequency fc1, the ambiguity function 202 corresponds to the cross correlation of a second echo/ping pair having an intermediate center frequency fc2, and the ambiguity function 203 corresponds to the cross correlation of a third echo/ping pair having a high center frequency fc3. FIG. 2a depicts a detailed view of the main lobes of the ambiguity functions 201-203, and FIG. 2b depicts the main lobes and side lobes of the ambiguity functions 201-203. Each one of the ambiguity functions 201-203 comprises a respective peak value, which is indicative of the range of the target returning the echo in a sonar ranging system.

In high SNR sonar environments (i.e., when the noise level is low), the peak of the ambiguity function is generally located at the main lobe of the function. In this case, the peaks of the ambiguity functions 201-203 are regarded as having low ambiguity, and may be located within the width of the main lobes of the functions at about time $\tau_0$, as illustrated by the vertical line of FIG. 2a. It is appreciated that the time $\tau_0$ corresponds to the actual range of the target. The effect of the low level of noise in the sonar environment is to jitter the position of the peak around the time $\tau_0$. To a first approximation, the magnitude of this jitter (also known as peak variability) is relatively low, e.g., the peak variability is typically less than the width of the main lobes, as illustrated by the horizontal lines of FIG. 2a. The lengths of the horizontal lines of FIG. 2a are indicative of the levels of peak variability associated with the respective ambiguity functions 201-203. In the illustrated embodiment, the lowest peak variability is associated with the ambiguity function 203 (high center frequency fc3), and the highest peak variability is associated with the ambiguity function 201 (low center frequency fc1).

In low SNR sonar environments (i.e., when the noise level is high, for example, when the noise level is of the order of the difference between the amplitudes of the main lobe and the first side lobe), the peak of the ambiguity function may not be located within the main lobe of the function, but instead may be located at one of the side lobes. In this case, the peaks of the ambiguity functions 201-203 are regarded as having high ambiguity, and may be located (1) within the width of a side lobe at about time $\tau_{-2}$ for the function 203, (2) within the width of a side lobe at about time $\tau_{-2.5}$ for the function 202, and (3) within the width of a side lobe at about time $\tau_{-3}$ for the function. 201, as illustrated by the vertical lines 203a, 202a, and 201a, respectively, of FIG. 2b. The effect of the high level of noise in the sonar environment is to significantly increase the peak variability, thereby increasing the potential error in sonar ranging. The horizontal lines in FIG. 2b illustrate the potential error in sonar ranging that can result from such high noise levels. The peak variability associated with the ambiguity functions 201-203 is indicative of the accuracy of echo delay estimates for the respective echo/ping pairs.

Figure 3A:
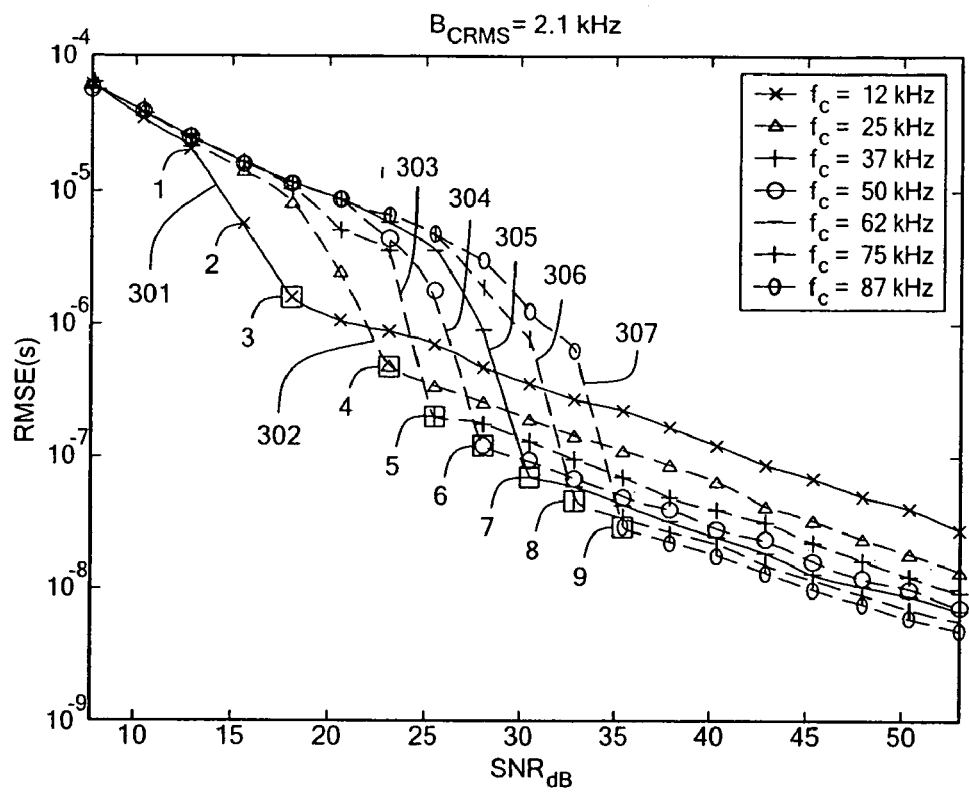
FIG. 3a is a diagram illustrating peak variability as a function of signal-to-noise ratio and center frequency for a plurality of frequency bands.

FIG. 3a depicts peak variability as a function of SNR (dB) and center frequency fc for a plurality of frequency bands. As shown in FIG. 3a, peak variability is expressed in terms of root mean square error (RMSE, seconds), which is a temporal representation of the potential error in echo delay estimation. Further, the center frequencies fc of the frequency bands are equal to 12 kHz, 25 kHz, 37 kHz, 50 kHz, 62 kHz, 75 kHz, and 87 kHz, respectively, and the centralized root mean square bandwidth $B_{CRMS}$ of the pings is fixed at 2.1 kHz.

For example, a plurality of peak variability curves 301-307 (see FIG. 3a) may be obtained via Monte Carlo simulations. Specifically, sonar pings may be expressed as cosine packets of the form $$\psi_{\sigma,\eta}(t) = K_{\sigma,\eta} \exp(-t^2/2(STD)^2)\cos(2\pi\eta t), \quad (2)$$

in which "$\eta$" is the center frequency, "STD" is the standard deviation of a peak location in time which controls the spread in time of the ping and its frequency bandwidth, and "$K_{\sigma,\eta}$" is a normalization factor such that $$\int \psi^2_{\sigma,\eta}(t)dt = 1, \quad (3)$$

in which the integration operation is performed from $-\infty$ to $+\infty$. Further, white noise may be added to the pings to generate noisy echoes for simulation purposes, and a temporal indication of the echo delay estimate may be computed as the time corresponding to the maximum amplitude of the cross correlation between the echo and the ping.

Figure 3B:
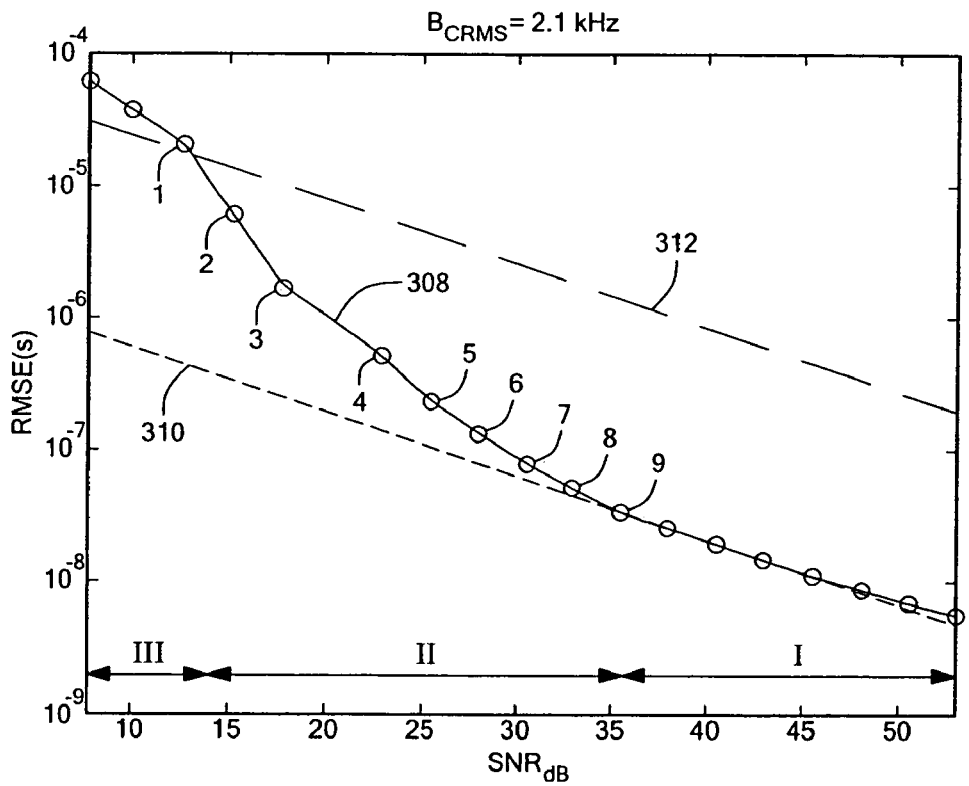
FIG. 3b is a diagram illustrating a performance curve derived from the diagram of FIG. 3b.

As shown in FIG. 3a, each one of the simulation curves 301-307 is approximately linear within a first SNR range of about 35-50 dB (see also region I of FIG. 3b). Further, for each curve 301-307, there is a sharp transition from lower RMSE levels to higher RMSE levels within a second SNR range of about 15-35 dB (see also region II of FIG. 3b), thereby indicating significant increases in peak variability. Within a third SNR range of about 5-15 dB (see also region III of FIG. 3b), the curves 301-307 are again approximately linear. It is noted that the curve 308 depicted in FIG. 3b is a performance curve comprising a composite of the peak variability curves 301-307, including breakpoints 1-9 (see FIG. 3a). Accordingly, as the SNR decreases (i.e., as the noise level increases), the RMSE levels gradually increase within region I until sharp transitions occur from lower RMSE levels to significantly higher RMSE levels within region II—the RMSE levels then continue to increase more rapidly within region III. It is noted that within region III, the sonar range resolution falls sharply until the sonar is ineffective and the target is considered to be out-of-range.

Specifically, within region I, the simulation curves 301-307 approximately track a line 310 (see FIG. 3b), which may be defined as $$STD = (2\pi B_{RMS} d)^{-1}, \quad (4)$$

in which "STD" is the standard deviation of a peak location in time and is proportional to the RMSE, "$B_{RMS}$" is the root mean square bandwidth of the ping, and "d" is the SNR. A derivation of equation (4) is described in *Probability and Information Theory with Applications to Radar*, P. M. Woodward, New York, McGraw-Hill Book Company, Inc., copyright 1953, which is incorporated herein by reference. It is noted that $B_{RMS}$ may be expressed as $$B_{RMS} = (\int f^2 P_{SD}(f) df)^{1/2}, \quad (5)$$

in which "$P_{SD}(f)$" is the power spectral density of the ping, and the integration operation is performed from 0 to $+\infty$. Further, d may be expressed as $$d = (2E/N_0)^{1/2}, \quad (6)$$

in which "E" is the total energy of the echo, and "$N_0$" is the spectral density of the noise. Accordingly, $$SNR(dB) = 20 \log_{10} d. \quad (7)$$

Moreover, following the sharp transitions from lower RMSE levels to higher RMSE levels within region II (see FIG. 3b), the simulation curves 301-307 approximately track a line 312 (see FIG. 3b), which may be defined as $$STD = (2\pi B_{CRMS} d)^{-1}, \quad (8)$$

in which "$B_{CRMS}$" is the centralized root mean square bandwidth of the transmitted pulse. The RMSE levels continue to increase at a faster rate within region III (see FIG. 3b). It is noted that $B_{CRMS}$ may be expressed as $$B_{CRMS} = (\int (f-fc)^2 P_{SD}(f) df)^{1/2}, \quad (9)$$

in which "fc" is the center frequency of the ping, and the integration operation is performed from 0 to $+\infty$. It is further noted that fc may be expressed as $$fc = \int f P_{SD}(f) df, \quad (10)$$

in which the integration operation is performed from 0 to $+\infty$. Moreover, the root mean square bandwidth may be expressed as $$B_{RMS}^2 = B_{CRMS}^2 + fc^2. \quad (11)$$

Accordingly, in the event the center frequency fc is much larger than the centralized root mean square bandwidth $B_{CRMS}$, $$B_{RMS} \approx fc. \quad (12)$$

The behavior of the simulation curves 301-307 within region I (see FIGS. 3a-3b) is characteristic of the performance of a "coherent" receiver, which estimates the echo delay relative to a peak of the ambiguity function within the width of the function's main lobe. The behavior of the curves 301-307 after their sharp transitions from lower RMSE levels to higher RMSE levels within region II (see FIGS. 3a-3b) is characteristic of the performance of a "semi-coherent" receiver, which estimates echo delay relative to the peak of the envelope of the ambiguity function. As illustrated in FIG. 3a, echo delay estimates provided by the semi-coherent receiver have associated errors (RMSE) that are significantly higher than the errors associated with the echo delay estimates of the coherent receiver.

In a first embodiment of the sonar system 100, the accuracy of echo delay estimation is increased via a method employing multiple echo/pulse pairs in an active sonar system, or successive echoes in a passive sonar system. The method includes estimating the distribution of echo delays corresponding to multiple pings, and eliminating echoes that provide echo delay estimations that lie outside defined boundaries of the distribution. The remaining echoes are then employed to improve the echo delay estimation. The method of operation of this first embodiment is described below by reference to FIGS. 1 and 4.

As depicted in step 402, multiple echoes are received by the sensors 102.1-102.n, and are provided in turn to the receiver 104 and to the time delay estimator 108, which includes the signal processor 106. The multiple echoes are then preprocessed, as depicted in step 404, by the signal processor 106. In the event the time delay estimator 108 comprises a cross correlator, multiple echo/ping pairs are cross correlated, as depicted in step 406, and cross correlation output data is provided to the data analyzer 110. It is noted that at least some of the respective echo/ping pairs are received and cross correlated at different points in time. Respective echo delay estimations are then determined, as depicted in step 408, and a distribution of the echo delay estimates is generated, as depicted in step 410, by the data analyzer 110. Next, an initial mean of the distribution of echo delay estimates is calculated, as depicted in step 412, by the data analyzer 110. A first set of boundaries of the distribution is then determined, as depicted in step 414, and echo delay estimates lying outside the first set of boundaries ("outliers") are removed, as depicted in step 416, by the data analyzer 110. Next, the mean of the distribution is recalculated, as depicted in step 418, and the recalculated mean is compared to the initial mean, as depicted in step 420, by the data analyzer 110. In the event the difference between the recalculated mean and the initial mean is greater than or equal to a predetermined threshold value, as depicted in step 422, a next set of distribution boundaries is determined, as depicted in step 414, by the data analyzer 110. Next, additional outliers are removed from the distribution based on the next set of distribution boundaries, as depicted in step 416, by the data analyzer 110. The mean of the distribution is then recalculated, as depicted in step 418, and compared to the prior calculated mean, as depicted in step 420, by the data analyzer 110. In the event the difference between the recalculated mean and the prior mean is less than the predetermined threshold value, as depicted in step 422, the process ends and the final recalculated mean of the echo delay estimation distribution is used to estimate the echo delay with increased accuracy. In the event the difference between the recalculated mean and the prior mean is not less than the predetermined threshold value, the process loops back to step 414 to determine a new set of distribution boundaries.

Figure 4:
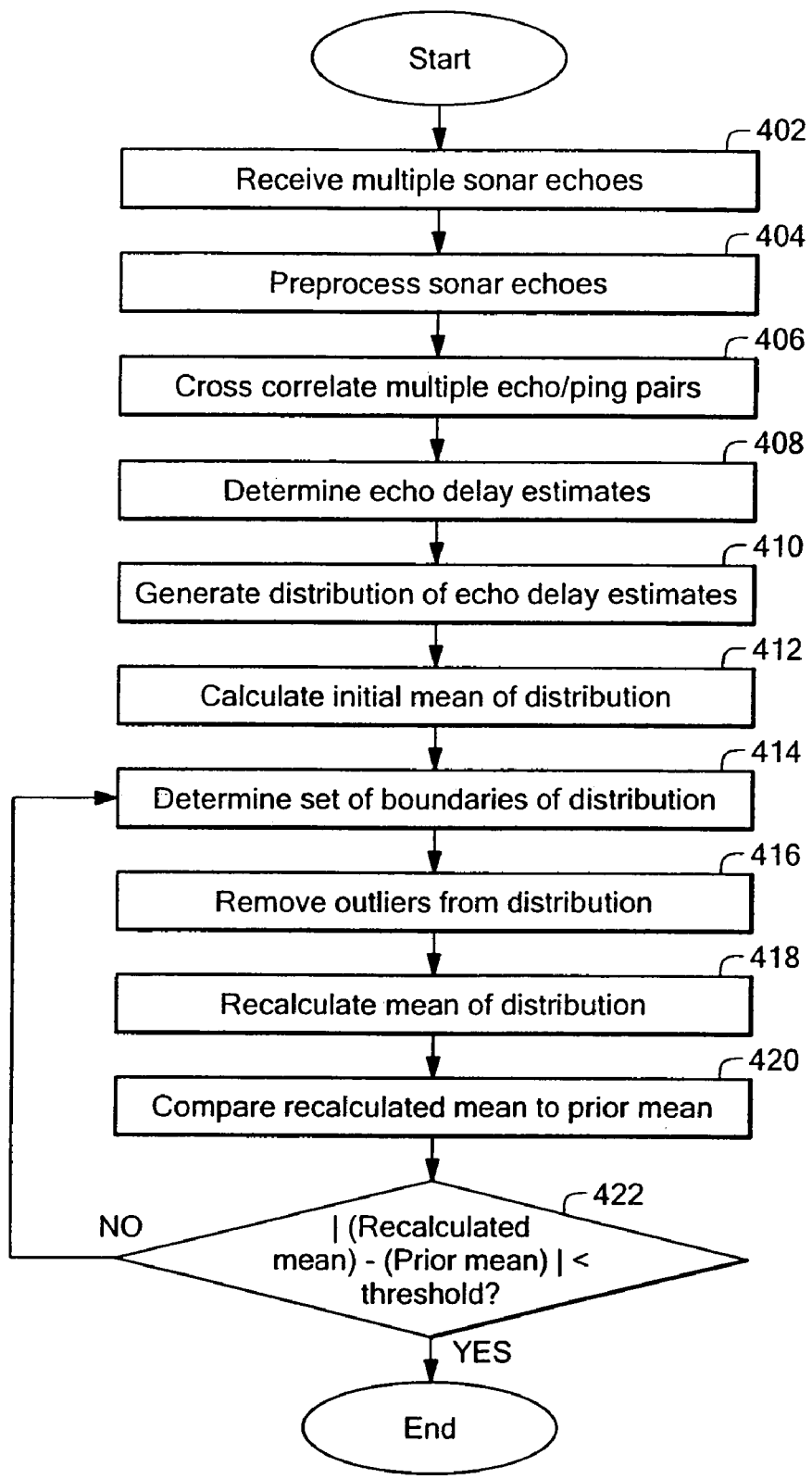
Figure 5A:
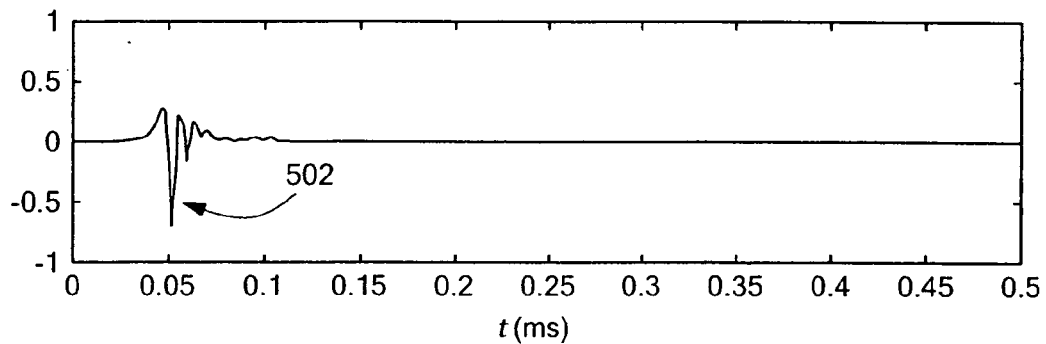
Figure 5B:
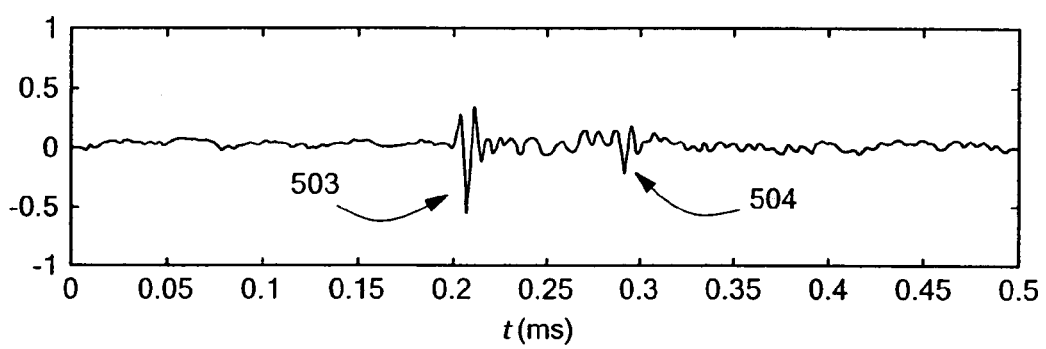

The method of FIG. 4 will be better understood by reference to the following illustrative example. In this example, increased accuracy in echo delay estimation is illustrated via improved discrimination of a target comprising a cylindrical container filled with different liquids such as fresh water, saline water, glycerol, or kerosene. Multiple pings are transmitted toward the target, and returning echoes are recorded by one or more hydrophone sensors. Because physical properties such as density and compressibility of the liquids differ from each other, a liquid inside the cylindrical target can be identified based on the sound velocity within the liquid. The multiple pings transmitted toward the target are broadband and have a prominent peak 502 in the time domain, as depicted in FIG. 5a. When each ping penetrates the cylindrical target, the peak is maintained after being bounced from the front and the back of the cylinder. Two peaks 503-504 can therefore be detected in the successive echoes, as depicted in FIG. 5b, and the time difference between the two peaks 503-504 can be measured. Accordingly, discrimination of the liquid within the target can be achieved by analyzing the temporal differences between successive echoes, which are referred to herein as the peak arrival time differences (PATDs).

Specifically, the PATD is defined as the difference between the peak arrival times of successive echoes. For example, the peak arrival times of successive echoes may be expressed as $$t_{max,a} = \arg\max y(t) \tag{13}$$

$$t_{max,b} = \arg\max y'(t), \tag{14}$$

in which "y(t)" and "y'(t)" designate preprocessed sonar echoes. It is noted that y'(t) is generated with the peak near $t_{max,a}$ removed. Accordingly, the PATD may be expressed as $$PATD = |t_{max,a} - t_{max,b}|. \tag{15}$$

It is noted that sonar pings may be subject to phase inversion when they are reflected by low density media such as kerosene. Further, the detection of peaks in echoes in the time domain is often sensitive to noise. Moreover, the wave shape of the echoes may change as they propagate in time due to dispersion. As a result, there may be a significant amount of uncertainty in the temporal locations of peaks in the echoes.

For this reason, the echoes are preprocessed to make the determination of the PATD more stable. In the presently disclosed embodiment, the signal processor 106 (see FIG. 1a) employs a plurality of preprocessing techniques. In a first preprocessing technique, the absolute values of the echoes are taken to prevent peak loss by phase inversion, i.e., $$ya(t) = |x(t)|. \tag{16}$$

In a second preprocessing technique, a matched filter such as a linear filter is employed in the receiver 104 (see FIG. 1a) to enhance signal detectability by increasing the signal-to-noise ratio (SNR). In the preferred embodiment, the time-reversed pinging signal yields the maximum SNR, and the resulting output signal is expressed as $$ym(t) = \int_{-\infty}^{\infty} x(t')s(t'-t)dt' = x(t) * s(t), \tag{17}$$

in which "s(t)" and "x(t)" represent the pings and the echoes, respectively.

In a third preprocessing technique, the wave envelope peak is detected to reduce temporal uncertainty. In the preferred embodiment, instantaneous envelope detection (IED) is employed to detect abrupt changes in the wave amplitude. The instantaneous envelope is the amplitude of an analytic signal, of which the real part is the recorded signal and the imaginary part is a Hilbert transform of the signal. For example, the Hilbert transform $\hat{x}(t)$ of a signal x(t) may be expressed as $$\hat{x}(t) = x(t) * \frac{1}{\pi t} = \frac{1}{\pi} \int_{-\infty}^{\infty} \frac{x(t')}{t-t'} dt'. \quad (18)$$

Accordingly, the envelope function $y_e(t)$ may be expressed as $$y_e(t) = x(t) + i\hat{x}(t)| \quad (19)$$

Figure 6A:
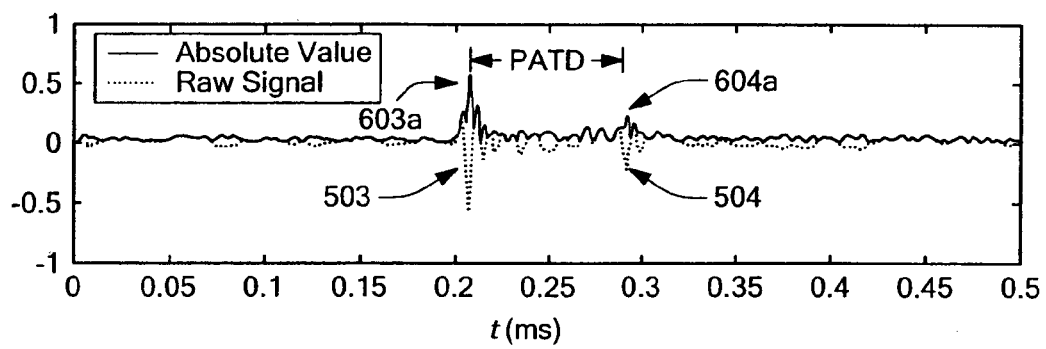
Figure 6B:
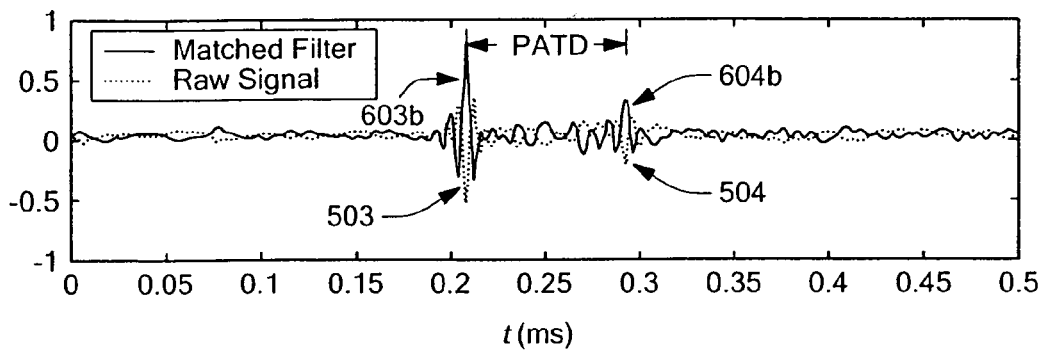
Figure 6C:
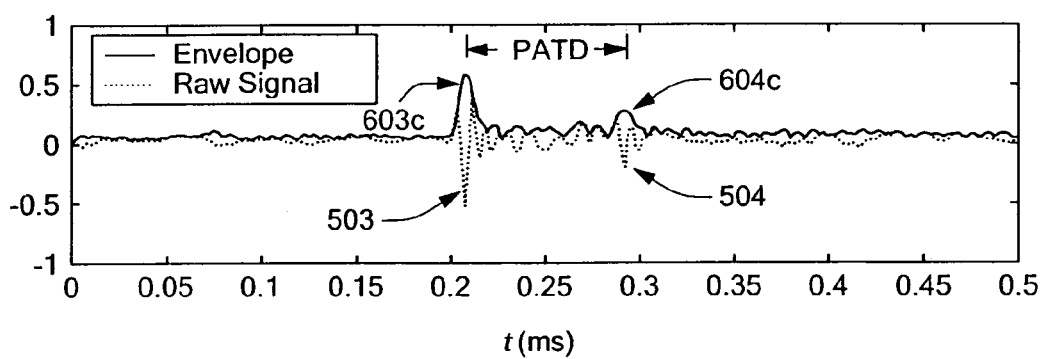

FIGS. 6a-6c depict the successive echoes 503-504 of FIG. 5b, and preprocessed versions 603a-603c, 604a-604c of the successive echoes 503-504. FIG. 6a depicts the echoes 503-504 preprocessed to obtain the absolute values 603a-604a of the echoes, FIG. 6b depicts the echoes 503-504 preprocessed by a matched filter to obtain the filtered versions 603b-604b of the echoes, and FIG. 6c depicts the echoes 503-504 preprocessed to obtain the Hilbert transforms 603c-604c of the echoes. It is understood that the time delay estimator 108 (see FIG. 1a) may determine the PATD's directly from the preprocessed signals 603a-604a, 603b-604b, and 603c-604c.

Figure 7A:
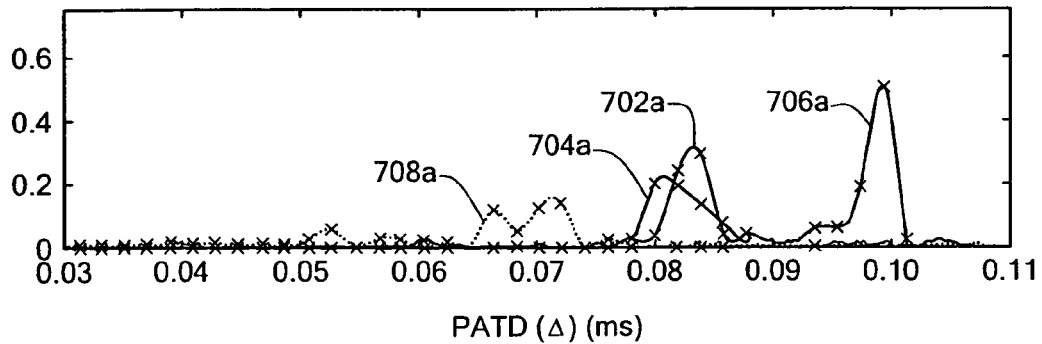
FIGS. 7a-7c are diagrams illustrating probability density functions for pulse arrival time delays (PATDs) corresponding to the preprocessed echoes of FIGS. 6a-6c.
Figure 7B:
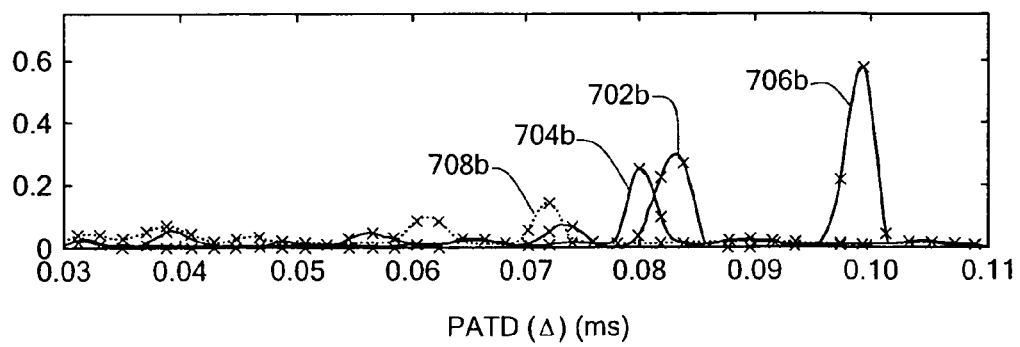
Figure 7C:
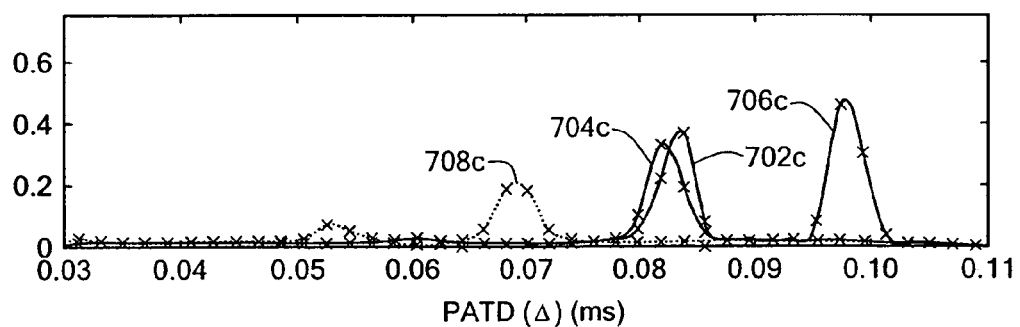

FIGS. 7a-7c depict probability density functions (PDFs) of the PATDs calculated after preprocessing the echoes by the absolute value technique (see FIG. 7a), the matched filtering technique (see FIG. 7b), and the instantaneous envelope detection technique (see FIG. 7c). As shown in FIGS. 7a-7c, the PDFs 702a-702c correspond to the target cylinder filled with fresh water, the PDFs 704a-704c correspond to the target cylinder filled with saline water, the PDFs 706a-706c correspond to the target cylinder filled with glycerol, and the PDFs 708a-708c correspond to the target cylinder filled with kerosene. As shown in FIG. 7a, the PDF 708a corresponding to kerosene has two peaks next to each other. This is because the absolute value preprocessing technique discards the phase information, and the PDF peaks therefore include both positive and negative peaks. As shown in FIG. 7b, the PDF 704b corresponding to saline includes multiple peaks. Specifically, the saline peaks indicate periodic error, which may be attributed to the coherence of sound waves between the first and second peaks. Such coherence produces a resonant standing wave inside the target cylinder filled with saline water. Because the matched filter tends to reinforce the carrier frequency, the resonance is emphasized. As shown in FIG. 7c, the PDFs 702c, 704c, 706c, and 708c determined after preprocessing with the instantaneous envelope detection technique are relatively stable and robust.

Figure 8:
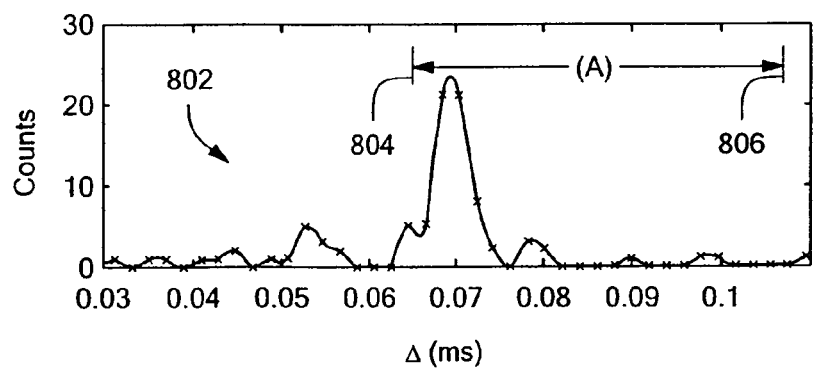
FIG. 8 is a diagram illustrating a distribution of PATDs for successive echoes returning from a target cylinder filled with kerosene.

FIG. 8 depicts an exemplary distribution 802 of PATDs for successive echoes returning from the target cylinder filled with kerosene. As shown in FIG. 8, a set of boundaries of the PATD distribution is indicated by reference numerals 804 and 806. In this example, the largest PATD distribution peaks of four classes are included within the boundaries 804 and 806, and the PATD distribution peaks lying outside of the boundaries ("outliers") are removed. Such outliers may be similarly removed from the PATD distributions corresponding to the target cylinder filled with fresh water, saline water, and glycerol. Next, the mean values of the PATD distributions are calculated without the outliers to obtain the mean PATD distributions (MPATDs) for fresh water, saline water, and glycerol, and kerosene.

Figure 9A:
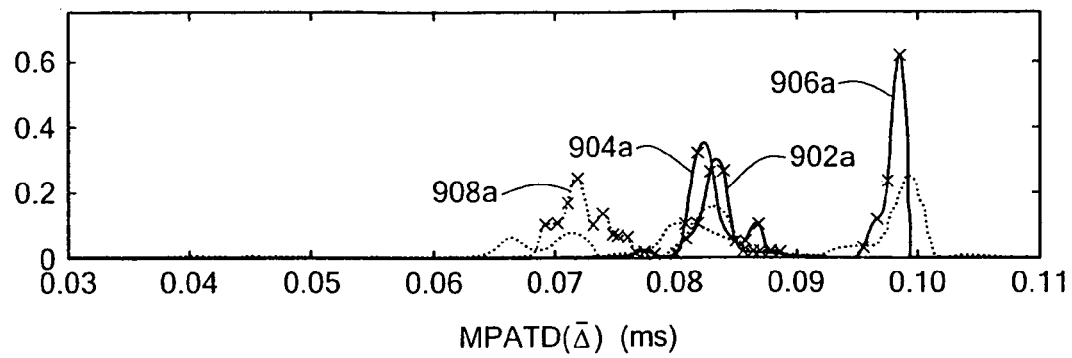
FIGS. 9a-9c are diagrams illustrating probability density functions for mean pulse arrival time delays (MPATDs) corresponding to the preprocessed echoes of FIGS. 6a-6c.
Figure 9B:
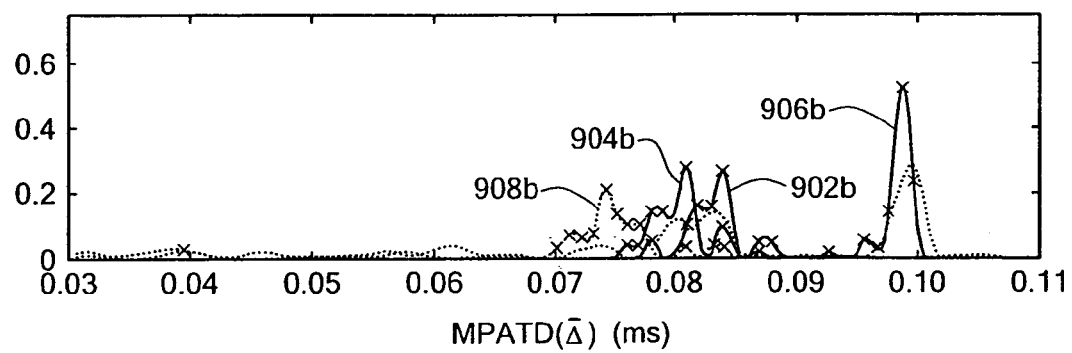
Figure 9C:
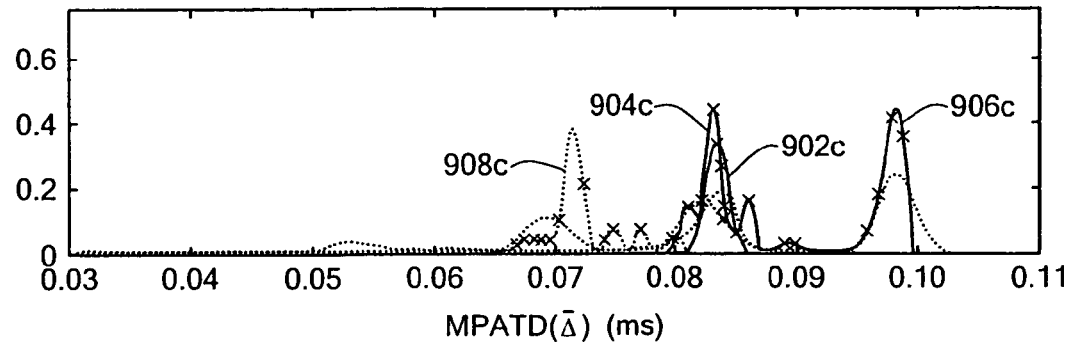

FIGS. 9a-9c depict the probability density functions (PDFs) of the MPATDs calculated after preprocessing by the absolute value technique (see FIG. 9a), the matched filtering technique (see FIG. 9b), and the instantaneous envelope detection technique (see FIG. 9c). As shown in FIGS. 9a-9c, the PDFs 902a-902c correspond to the target cylinder filled with fresh water, the PDFs 904a-904c correspond to the target cylinder filled with saline water, the PDFs 906a-906c correspond to the target cylinder filled with glycerol, and the PDFs 908a-908c correspond to the target cylinder filled with kerosene. As indicated by the narrower widths of the peaks in the MPATD PDFs for fresh water, saline water, glycerol, and kerosene, the discrimination of each liquid is improved. It is understood that a new set of boundaries of the MPATD distribution may be determined to remove additional outliers, and the mean values of the distributions may be recalculated to further improve target discrimination.

In a second embodiment of the sonar system 100 (see FIG. 1a), the accuracy of echo delay estimates is increased via a method that includes calculating the mode of echo delay estimation distributions generated from raw or preprocessed sonar signals. As described below, the method of this second embodiment not only increases the accuracy of echo delay estimates, but it also increases the noise tolerance of the system 100.

Figure 10A:
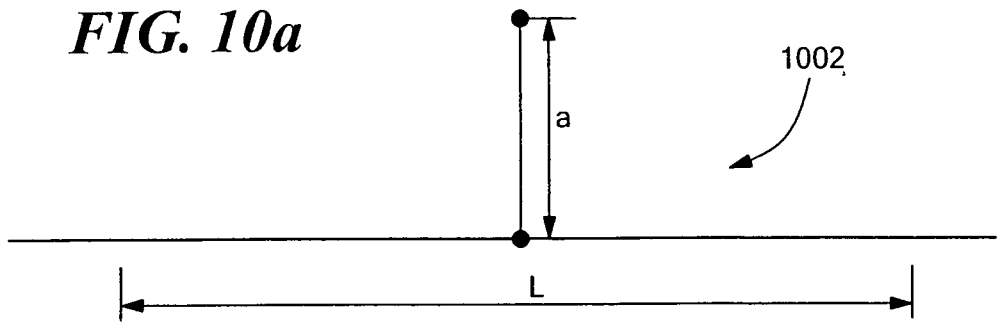
FIG. 10a is a conceptual model of a noiseless cross correlation function corresponding to a single echo/ping pair.

The method of the second embodiment of the sonar system 100 will be better understood by reference to the following analysis. FIG. 10a depicts a conceptual model of a noiseless cross correlation function 1002 corresponding to a single echo/ping pair. As shown in FIG. 10a, the function 1002 is a delta ($\delta$) function that is zero everywhere within an a priori window of length L, except at the time location ("bin") t=0 when it is equal to the energy of the ping. It is noted that this conceptual model corresponds to a sonar ping having infinite bandwidth. When white noise is added to the echo, the cross correlation function 1002 has a Gaussian distribution with multidimensional centers at zero for all values that are outside of the bin t=0, and a center at a=E>0 for the value of the function 1002 within the bin t=0, in which E is the energy of the echo. If $x_i$ is the value of the function 1002 within each bin t=i, and $x_0$ is the value within the bin t=0, then a probability density function (PDF) may be expressed as $$p(x_1, x_2, \ldots, x_N) = \frac{1}{(\sigma\sqrt{2\pi})^N} e^{\frac{\|\vec{x}-\vec{v}\|^2}{2\sigma^2}}, \quad (20)$$

$$\vec{v} = [a, 0, 0, \ldots, 0]^T$$

Using the Gaussian distribution, the probability "$\alpha$" of the event x1>xi (i≠1), which corresponds to the "correct" echo delay estimation for a given noise level $\sigma$ (i.e., for a given SNR), may be expressed as $$P(X_1 > X_i, i \neq 1) = \alpha = \int_{-\infty}^{\infty} dx_1 \int_{-\infty}^{x_1} dx_2 \int_{-\infty}^{x_1} dx_3 \ldots \quad (21)$$

$$\int_{-\infty}^{x_1} dx_N \frac{1}{(\sigma\sqrt{2\pi})^N} e^{\frac{\|\vec{x}-\vec{v}\|^2}{2\sigma^2}} \Rightarrow \alpha =$$

$$\frac{1}{2^{N-1}\sqrt{\pi}} \int_{-\infty}^{\infty} e^{-\left(x-\frac{a}{\sqrt{2}\sigma}\right)^2} [1 + \text{erf}(x)]^{N-1} dx.$$

Figure 10B:
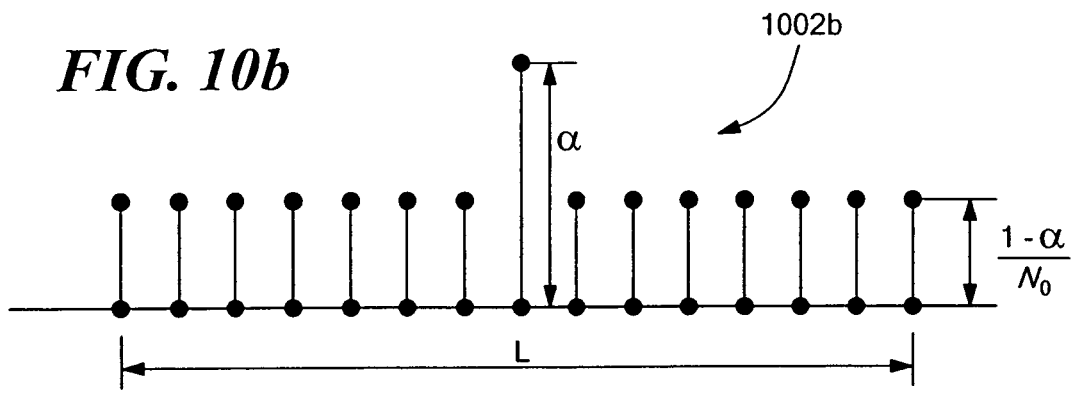

It is noted that the probability $\alpha$ expressed in equation (21) depends on "$\alpha/\sqrt{2}\sigma$", which is proportional to the signal-to-noise ratio (SNR). A probability of error "$\beta$" may therefore be expressed as 1−$\alpha$, which represents the probability that the amplitude of at least one peak disposed outside of the correct bin is larger than the amplitude of the peak disposed within the correct bin. FIG. 10b depicts the probability α of selecting a given bin in the cross correlation function 1002.

Figure 11A:
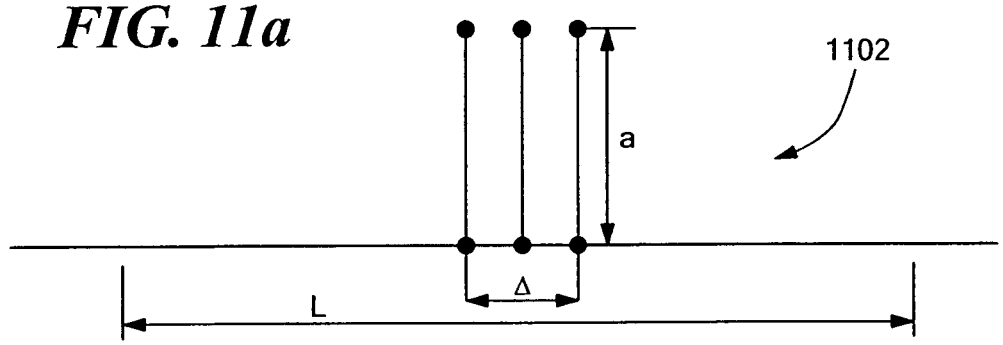
FIG. 11a is a second model of a cross correlation function corresponding to a single echo/ping pair.

FIG. 11a depicts a more practical model in which a cross correlation function 1102 of an echo/ping pair comprises a uniform distribution within an interval "Δ". It is noted that this second model corresponds to a sonar ping having a finite bandwidth. In the model of FIG. 11a, the cross correlation function 1102 is approximated by a piecewise constant function having an amplitude "a" within the central interval $I_\Delta$ and zero elsewhere. For example, the length L of the a priori window of the cross correlation function 1102 may correspond to sonar range. In the event the a priori window has a length of 2 L and a sampling frequency of "$f_s$" is employed, the total number of echo delay estimations may be expressed as $$N = N_a + N_0 = 2 \, L \cdot f_s, \quad (22)$$

in which "$N_a = \Delta \cdot f_s$" estimates are disposed within the central or "correct" bin t=0 and "$N_0$" estimates are disposed outside of the correct bin but within the a priori window. A random vector may be defined in which the first $N_a$ random variables correspond to the amplitudes of the estimates within the correct bin, and the last $N_0$ random variables correspond to the amplitudes of the estimates outside of the correct bin, in which $N_a$ and $N_o$ are integers. As indicated above, for white noise, the joint probability density function for the vector of random variables may be expressed as $$p(x_1, x_2, \ldots, x_N) = \frac{1}{(\sigma\sqrt{2\pi})^N} e^{\frac{\|\vec{x}-\vec{v}\|^2}{2\sigma^2}}, \quad (23)$$

$$\vec{v} = [\underbrace{a, a, \ldots, a}_{N_a}, \underbrace{0, 0, \ldots, 0}_{N_0}].$$

The probability of time delay estimation within the correct bin of the cross correlation function 1102 may therefore be expressed as $$P\left(\underset{1 \leq j \leq N}{\mathrm{argmax}}\{X_j\} \in I_\Delta\right) = \sum_{i=1}^{N_a} P(X_i > X_k, k \neq i) \Rightarrow \quad (24)$$

$$\frac{N_a}{2^{N-1}\sqrt{\pi}} \int_{-\infty}^{\infty} e^{-\left(x - \frac{a}{\sqrt{2}\sigma}\right)^2} \left[1 + \mathrm{erf}\left(x - a/\sqrt{2}\sigma\right)\right]^{N_a - 1} [1 + \mathrm{erf}(x)]^{N_0} dx.$$

Accordingly, for a given noise level "σ" (i.e., for a given SNR) the probability α that the correct bin is selected may be expressed as $$\alpha = \frac{N_a}{2^{N-1}\sqrt{\pi}} \quad (25)$$

$$\int_{-\infty}^{\infty} e^{-\left(x - \frac{a}{\sqrt{2}\sigma}\right)^2} \left[1 + \mathrm{erf}\left(x - \frac{a}{\sqrt{2}\sigma}\right)\right]^{N_a - 1} [1 + \mathrm{erf}(x)]^{N_0} dx.$$

Figure 11B:
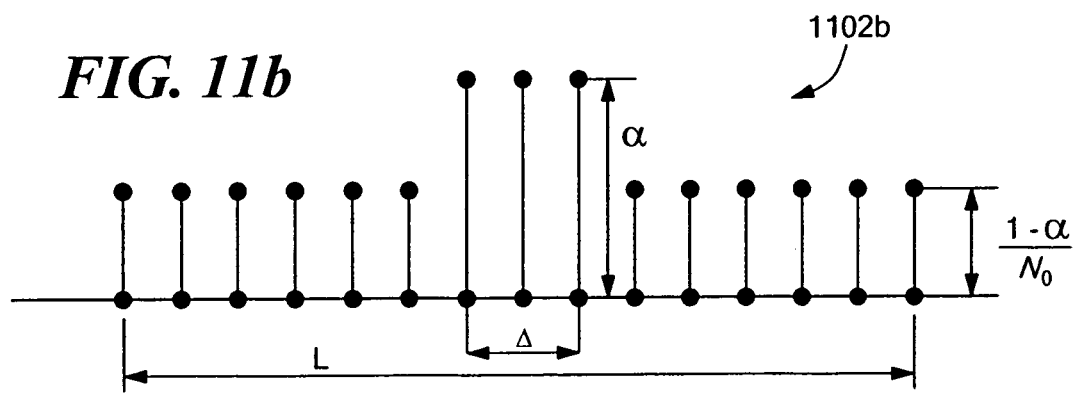

FIG. 11b depicts the probability α of selecting a given bin in the cross correlation function 1102.

As described above with reference to FIG. 3a, the peak variability curves 301-307 of FIG. 3a include sharp breakpoints between the curve regions corresponding to the coherent receiver and the curve regions corresponding to the semi-coherent receiver. As explained above, these breakpoints in the curves 301-307 indicate that echo delay estimation accuracy is sharply reduced as the SNR of the environment decreases. The accuracy breakpoints in peak variability curves are further analyzed below.

In this analysis, a random vector whose probability distribution is given by equation (24) is designated as "T". For an SNR value that is greater than a given value $SNR_0$, the probability of an echo delay estimate falling within the correct bin is greater than a given probability $\alpha_0$. The standard deviation STD of the distribution of echo delay estimation within the correct bin is designated as "$STD_\Delta$", and the standard deviation STD of the distribution outside of the correct bin is designated as "$STD_0$". The distribution T whose cumulative function is expressed by equation (25) is sampled. For n estimations, a fraction of the probability α of the n estimations falls within the correct bin on average, while βn estimations fall outside the correct bin. The standard deviation of the distribution may therefore be expressed as $$STD^2(T) = \alpha STD^2(T^\Delta) + \beta STD^2(T^0) = \alpha \sigma_\Delta^2 + \beta \sigma_0^2. \quad (26)$$

In this analysis, the accuracy breakpoint is defined as the noise level for which the contribution of $T^0$ to the total error becomes dominant. It is noted that the RMSE is significantly greater than that given by the uniform distribution on $I_\Delta$ alone when $$\alpha < \frac{\sigma_0^2}{\sigma_\Delta^2 + \sigma_0^2}. \quad (27)$$

The probability breakpoint may therefore be defined as $$\alpha_0 = \frac{(\sigma_0/\sigma_\Delta)^2}{1 + (\sigma_0/\sigma_\Delta)^2}. \quad (28)$$

Accordingly, the SNR corresponding to the accuracy breakpoint may be determined as the SNR value for which equation (25) equals equation (28).

As indicated above, the method of the second embodiment of the sonar system 100 (see FIG. 1a) includes calculating the mode of the echo delay estimation distribution generated from raw or preprocessed sonar signals. Such calculation of the distribution mode allows this second embodiment of the system 100 to increase its tolerance to noise. This will be better understood by reference to the following analysis.

A traditional way of combining information from multiple observations is to perform an averaging operation. Because the n echo delay estimations described above are independent and identically distributed, the central limit theorem indicates that the standard deviation (i.e., the error) of the averaged random vector is √n times smaller than the error corresponding to each of the n separate estimations. This holds true for the region of the peak variability curve (e.g., the peak variability curves 301-307) corresponding to the coherent receiver. However, the averaging operation does not allow the accuracy breakpoints of the curves 301-307 to be shifted to lower SNR values. Accordingly, while the averaging operation may improve accuracy, it generally does not increase noise tolerance.

For example, consider sampling from a uniform distribution within an interval $I_\Delta$ with probability $\alpha$, and sampling from a uniform distribution within an interval $I_0$ and probability $\beta$, in which the interval $I_0$ includes a gap corresponding to the interval $I_\Delta$. In the event the distributions are sampled n times to obtain $T_1, T_2, \ldots, T_n$ samples, an estimate for the time delay may be expressed in terms of the sample mean, i.e., $$\overline{T} = \frac{1}{n}\sum_{i=1}^{n} T_i. \tag{29}$$

On average, $\alpha n$ values $T_1^\delta, T_2^\delta, \ldots, T_{\alpha n}^\delta$ are within the correct bin, and $\beta n$ values $T_1^u, T_2^u, \ldots, T_{\beta n}^u$ are disposed outside of the correct bin. The sample mean may therefore be decomposed into two parts, i.e., $$\overline{T} = \frac{1}{n}\left(\sum_{i=1}^{\alpha n} T_i^\Delta + \sum_{i=1}^{\beta n} T_i^0\right). \tag{30}$$

Applying the central limit theorem to the sums in equation (30) yields $$\left(STD_\delta \sum_{i=1}^{\alpha n} T_i^\Delta\right)^2 = \alpha n \sigma_\Delta^2 \tag{31}$$

$$\left(STD_u \sum_{i=1}^{\beta n} T_i^0\right)^2 = \beta n \sigma_0^2,$$

in which "$STD_\delta$" denotes the standard deviation of the delta-like distribution (see FIG. 10), and "$STD_u$" denotes the standard deviation of the uniform distribution (see FIG. 11). It is noted that the root mean square error (RMSE) is significantly greater than that given by the delta distribution alone when $\beta n \sigma_0^2 > \alpha n \sigma_\Delta^2$, i.e., $$\alpha < \frac{\sigma_0^2}{\sigma_\Delta^2 + \sigma_0^2}. \tag{32}$$

It is noted that the bound on the probability expressed in equation (32) is equal to the bound on the probability expressed in equation (27) for a single ping, thereby indicating that the bound on the probability $\alpha$ does not change with the number of pings. For this reason, taking the mean of the distribution of echo delay estimations, as described above with reference to the first embodiment of the presently disclosed sonar system, generally does not improve the noise tolerance of the system, even though the accuracy of echo delay estimation is improved.

Figure 12:
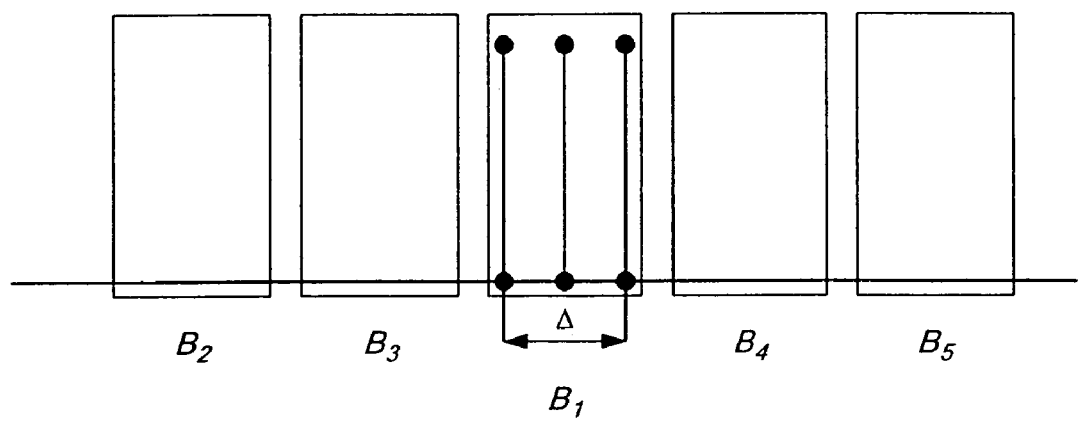
FIG. 12 is a third model of a cross correlation function corresponding to multiple echo/ping pairs.

The method of the second embodiment of the sonar system 100 (see FIG. 1a) increases the accuracy of echo delay estimation and improves the noise tolerance of the system via a calculation of the mode of the distribution of echo delay estimates derived from multiple pings. As depicted in FIG. 12, the a priori window of the cross correlation may be divided into a total of $m = \lfloor 2 L/\Delta \rfloor$ intervals $B_1, B_2, \ldots, B_m$, in which $B_1 = I_\Delta$ represents the correct bin. If $p_1, p_2, \ldots, p_m$ denote the probabilities of estimates falling in each of the intervals $B_1, B_2, \ldots, B_m$, respectively, and $Y_1, Y_2, \ldots, Y_m$ are random variables representing the number of estimates falling in each interval, then $$\sum_{j=1}^{m} Y_j = n, \tag{33}$$

$$\sum_{j=1}^{m} p_j = 1.$$

The joint probability distribution function for the echo delay estimates within each bin may be expressed as $$P(Y_1 = k_1, Y_2 = k_2, \ldots, Y_m = k_m) = \frac{n!}{k_1! k_2! \ldots k_m!} \tag{34}$$

$$p_1^{k_1} p_2^{k_2} \ldots p_m^{k_m}.$$

In this second embodiment, the probability of choosing the correct bin after calculating the mode of the distribution is defined as the probability that the number of estimates disposed within the correct bin $k_1$ is greater than the number of estimates disposed in any other bin $k_j$, $i \neq 1$, i.e., $$P_{correct} = P(Y_1 > Y_j, \forall j \neq 1) \tag{35}$$

$$= \sum_{\substack{k_1, k_2, \ldots, k_m \\ k_1 > k_j, \neq 1 \\ k_1 + k_2 + \ldots + k_m = n}} \frac{n!}{k_1! k_2! \ldots k_m!} p_1^{k_1} p_2^{k_2} \ldots p_m^{k_m}.$$

It is noted that the sum included in equation (35) may be decomposed into two parts, namely, the probability $P_{>50\%}$ that more than half of the "n" estimations fall into the correct bin, and the probability $P_{<50\%}$ that even if less than half of the n estimations fall into the correct bin, the number of estimations in the correct bin is greater than that of any other bin. Equation (35) may therefore be expressed as $$P_{correct} = P_{>50\%} + P_{<50\%}, \tag{36}$$

in which $$P_{>50\%} = \sum_{k_t > n/2} \binom{n}{k_1} p_1^{k_1} (p_2 + p_3 + \ldots + p_m)^{n - k_t}. \tag{37}$$

In the second embodiment, the probability $\beta$ of an echo delay estimate falling outside of the correct bin is substantially uniform over the length L of the a priori window. The probability of an echo delay estimate falling within any given bin or interval $\Delta$ of the a priori window is therefore equal to $\beta/(m-1)$, and $$P_1 = \alpha,$$

$$P_j = (1-\alpha)/(m-1), j \neq 1, \tag{38}$$

in which "$P_1$" is the probability corresponding to the correct bin and "$P_j$" is the probability corresponding to all other bins other than the correct bin. Substituting equations (38) into equation (37), $P_{>50\%}$ may be expressed as $$P_{>50\%} = \sum_{k>n/2} \binom{n}{k} \alpha^k (1-\alpha)^{n-k}, \qquad (39)$$

in which "$\alpha$" is a function of the SNR of the environment (see equation (25)). The SNR for which $P_{>50\%} = \alpha_0$ (see also equation (28)) represents an upper bound on the accuracy breakpoint for echo delay estimations calculated using the mode of "n" estimates, i.e., $$\alpha_0 = \sum_{k>n/2} \binom{n}{k} \alpha(SNR_{>50\%})^k [1 - \alpha(SNR_{>50\%})]^{n-k}. \qquad (40)$$

It is noted that the upper bound corresponding to the total probability of choosing the correct bin, as expressed in equation (36), is lower than that expressed in equation (40), i.e., $$SNR_{BP} \leq SNR_{>50\%}. \qquad (41)$$

The accuracy breakpoint that can be achieved via the calculation of the mode of the echo delay estimation distribution therefore corresponds to a lower SNR than that expressed in equation (41), which is significantly better than the accuracy breakpoint that is achievable from a single ping, or from a calculation of the mean of the distribution of echo delay estimations derived from multiple pings.

Figure 13A:
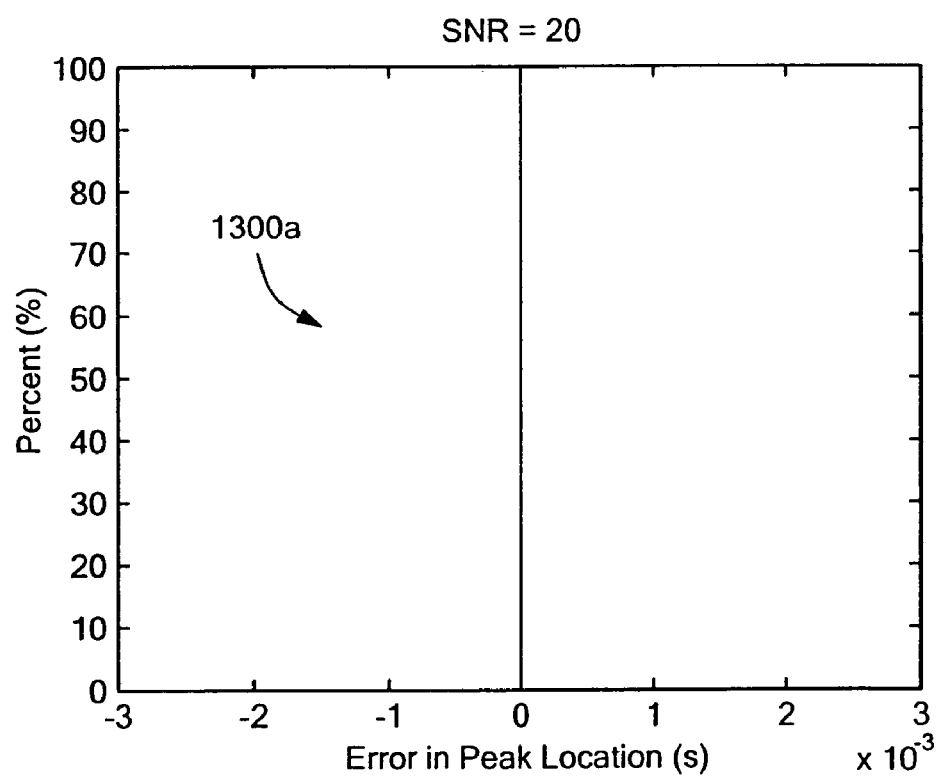
Figure 13B:
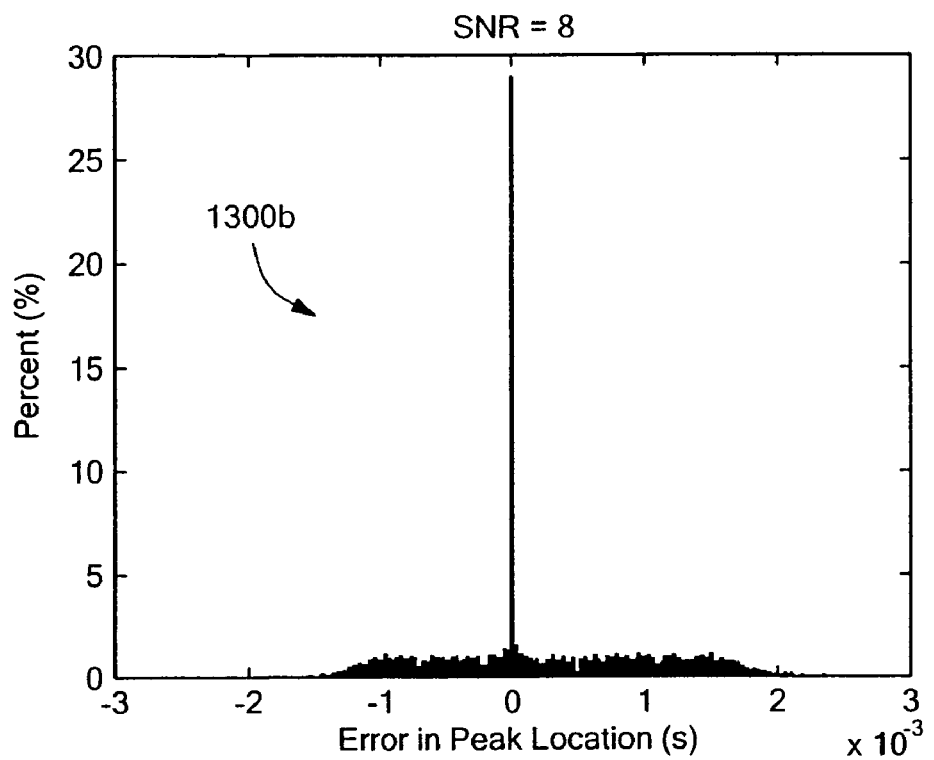
Figure 13C:
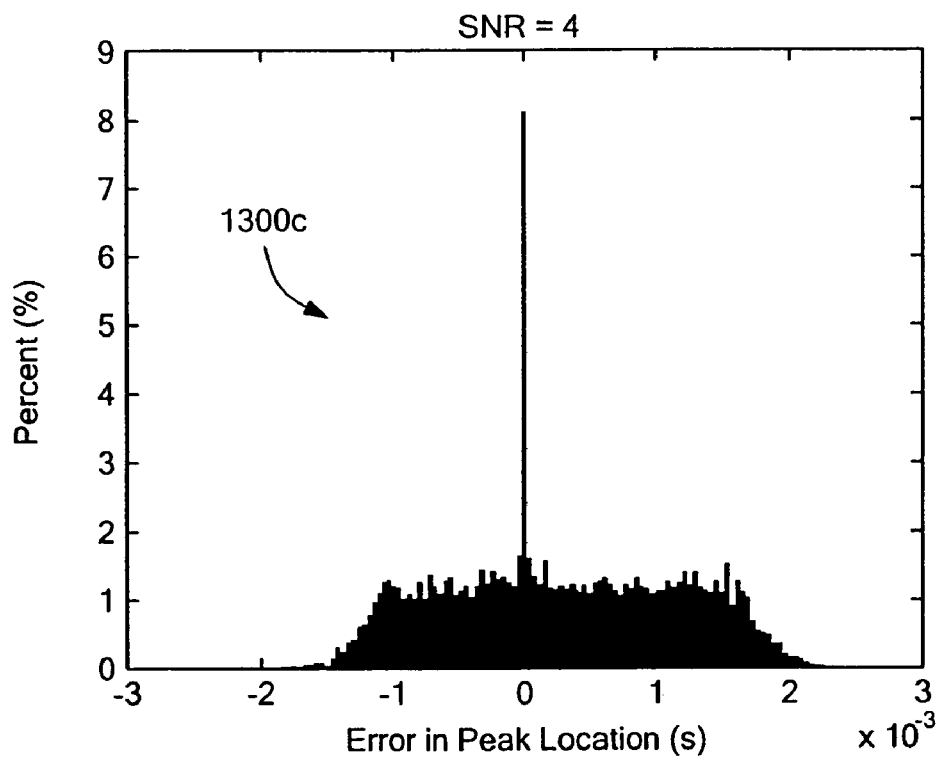
Figure 13D:
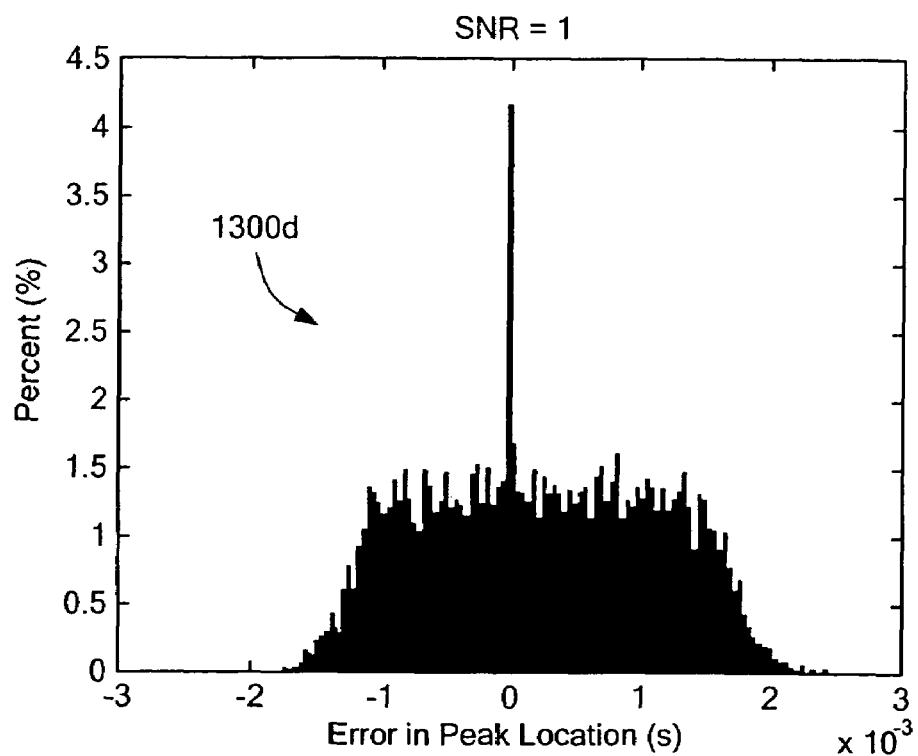

The second embodiment of the presently disclosed sonar system 100 (see FIG. 1a) will be better understood by reference to the following illustrative example. In this example, distributions of echo delay estimations are obtained via Monte Carlo simulations using a cosine packet. FIGS. 13a-13d depict simulated distributions 1300a-1300d of echo delay estimations in histogram form for different SNR values. As shown in FIG. 13a, for high SNR values (i.e., ≧20 dB), essentially all of the echo delay estimates are disposed within the central or correct bin. As the SNR decreases (i.e., as the noise level increases), significant errors in the echo delay estimates appear. As shown in FIGS. 13b-13d, such errors are substantially uniformly distributed over the length of the a priori window, and the ratio of the "correct" echo delay estimates (corresponding to the central bin) and the level of the uniform error distribution outside of the central bin generally decreases with the level of SNR. It is noted, however, that even in the presence of relatively high levels of noise, the peaks of the distributions within the central or correct bins are significantly greater than those within any one of the other bins.

Figure 14A:
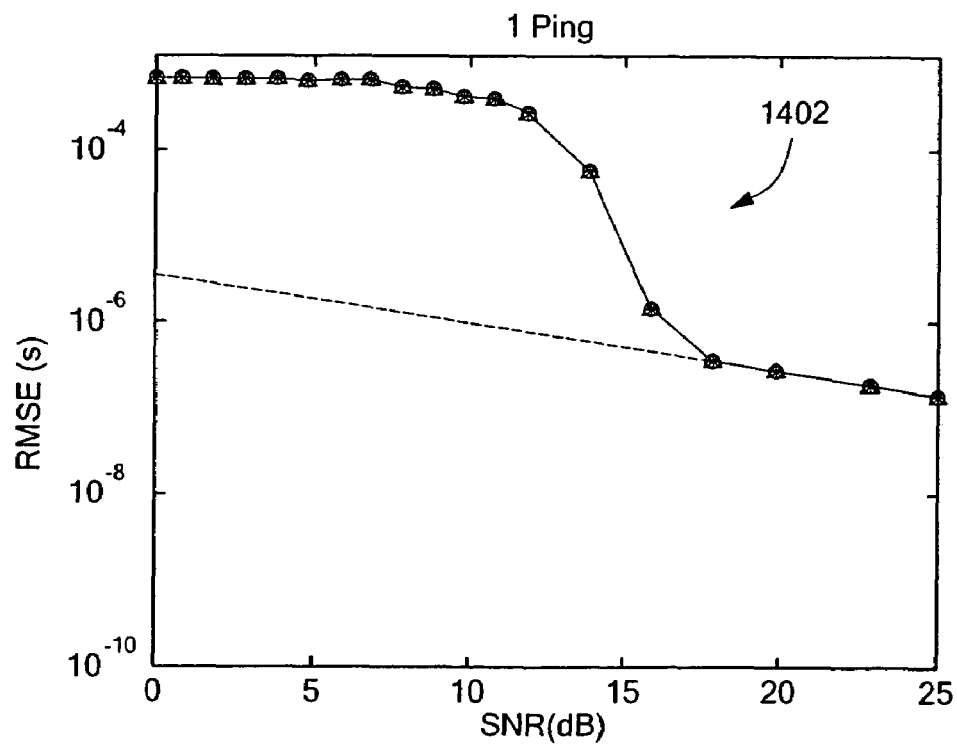
FIGS. 14a-14d are diagrams illustrating peak variability as a function of signal-to-noise ratio for different numbers of pings.
Figure 14B:
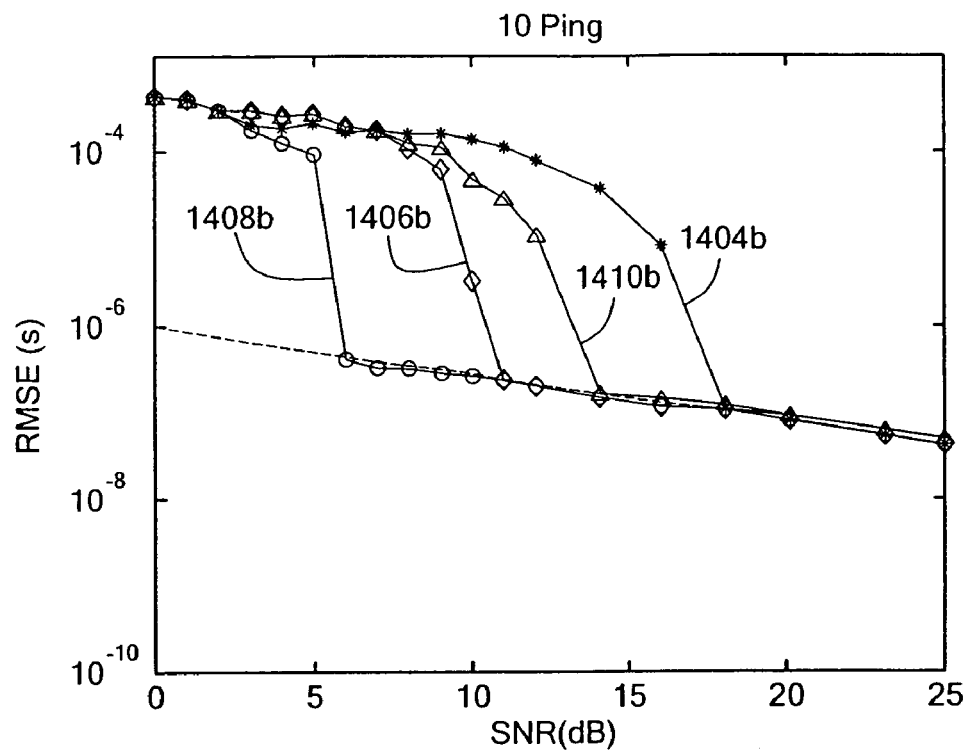
Figure 14C:
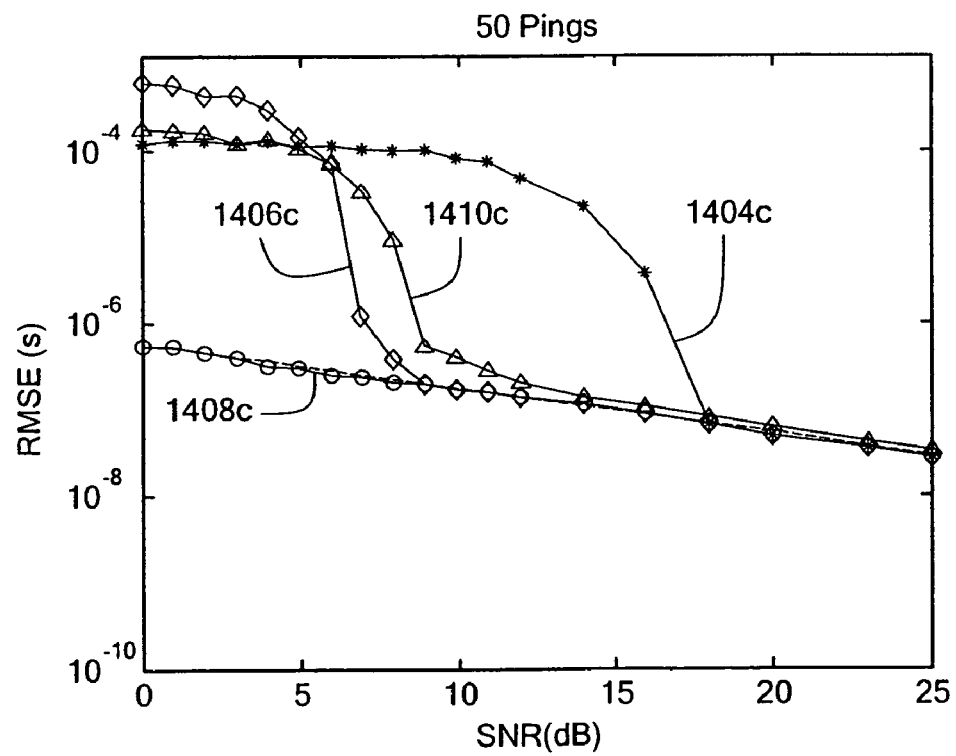
Figure 14D:
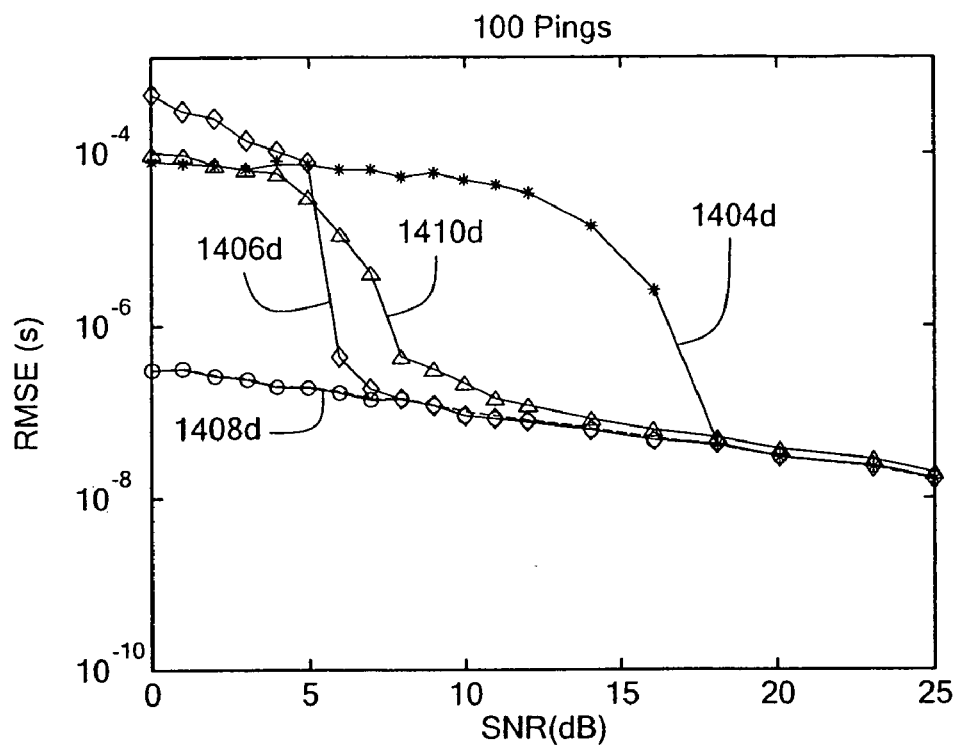

FIGS. 14a-14d depict representative peak variability curves corresponding to different numbers of pings. Specifically, FIG. 14a depicts a peak variability curve 1402 for a single ping. As shown in FIG. 14a, for high SNR values (e.g., greater than about 17 dB), the accuracy of echo delay estimation is consistent with the performance of a coherent receiver. For lower SNR values (e.g., less than about 17 dB), there is an accuracy breakpoint indicating a sharp transition from low RMSE levels to high RMSE levels. FIGS. 14b-14d depict peak variability curves 1404b-1404d, 1406b-1406d, and 1408b-1408d including accuracy breakpoints for multiple pings, e.g., 10 pings (see FIG. 14b), 50 pings (see FIG. 14c), and 100 pings (see FIG. 14d). Specifically, the curves 1404b-1404d and 1406b-1406d are derived from calculations of the mean and the mode, respectively, of the distribution of echo delay estimates. Further, the curves 1408b-1408d correspond to optimal cross correlations of the multiple echo/ping pairs. As shown in FIGS. 14b-14d, the accuracy breakpoints included in the curves 1408b-1408d represent the optimal breakpoints for a stationary sonar system and a stationary target. The optimal accuracy breakpoints are difficult to obtain, however, due to the need for precise registration of the multiple echo/ping pairs. Such precise registration of echoes/pings normally requires the distance between the sonar system and the target to be either constant or known in advance, which is not always the case in practical system applications.

As indicated above, FIGS. 14b-14d also depict the peak variability curves 1404b-1404d and 1406b-1406d resulting from the calculations of the mean and the mode, respectively, of the echo delay estimation distribution for multiple pings. As shown in FIGS. 14b-14d, the curves 1404b, 1406b, 1408b, and 1410b, the curves 1404c, 1406c, 1408c, and 1410c, and the curves 1404d, 1406d, 1408d, and 1410d gradually shift to lower RMSE values as the number of pings increases, thereby indicating increased accuracy. Further, the accuracy breakpoints included in the curves 1406b-1406d corresponding to the mode calculation are shifted to lower SNR values as the number of pings increases, thereby indicating increased noise resiliency. No such shifting occurs for the accuracy breakpoints included in the curves 1404b-1404d corresponding to the calculation of the mean of the echo delay estimation distribution.

Figure 15:
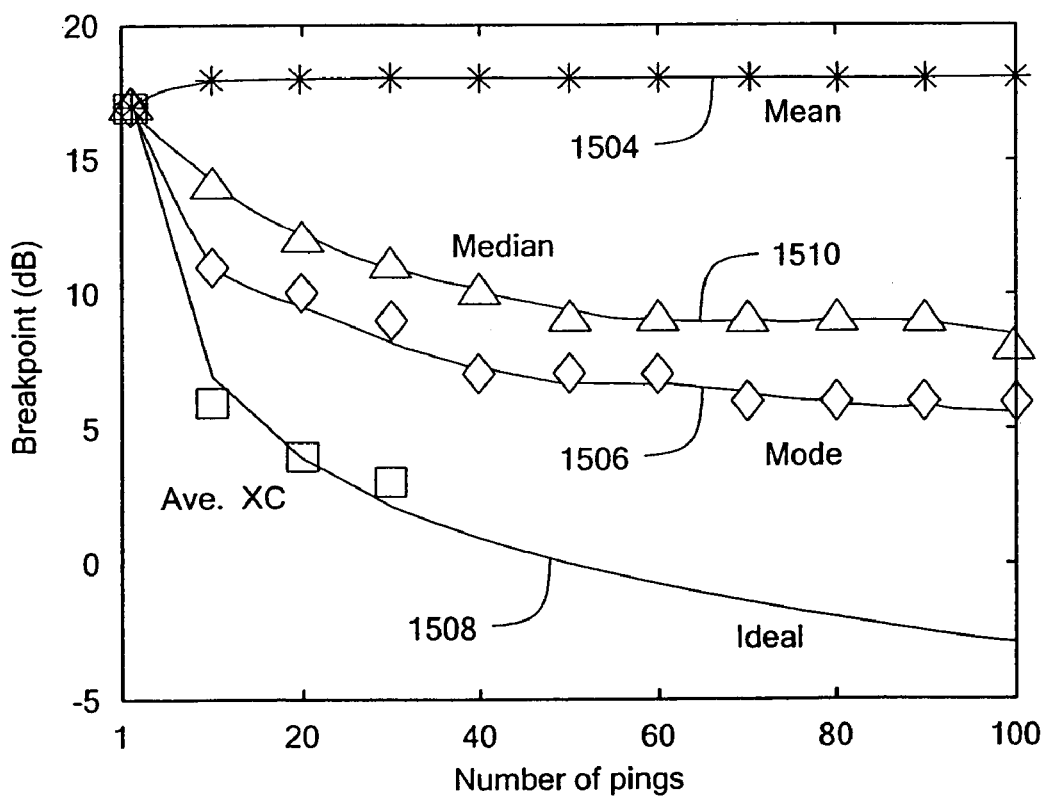
FIG. 15 is a diagram of performance curves comprising composites of the peak variability curves of FIGS. 14a-14d, showing accuracy breakpoints versus the number of pings.

FIG. 15 depicts a plurality of performance curves 1504-1508 comprising composites of the peak variability curves 1404b-1404d, 1406b-1406d, and 1408b-1408d, respectively, showing the accuracy breakpoints versus the number of pings. Specifically, the curve 1508 corresponds to the optimal breakpoints for the cross correlation of multiple echo/ping pairs, the curve 1504 corresponds to the accuracy breakpoints obtained after calculating the mean of the distribution of echo delay estimates, and the curve 1506 corresponds to the accuracy breakpoints obtained after calculating the mode of the echo delay estimation distribution. As shown in FIG. 15, the accuracy breakpoints obtained after calculating the mode of the distribution are shifted to lower SNR values as the number of pings increases, while the accuracy breakpoints obtained after calculating the mean of the distribution do not change substantially as the number of pings increases.

Having described the above illustrative embodiments, other alternative embodiments or variations may be made. For example, it was described that temporal differences between successive received signals may be estimated by determining the peak arrival time differences (PATDs) of the signals. However, it should be understood that temporal differences between signals may be estimated using any suitable prominent feature of the signals such as prominent peaks, valleys, energies, and/or zero crossings of the signals.

Figure 1B:
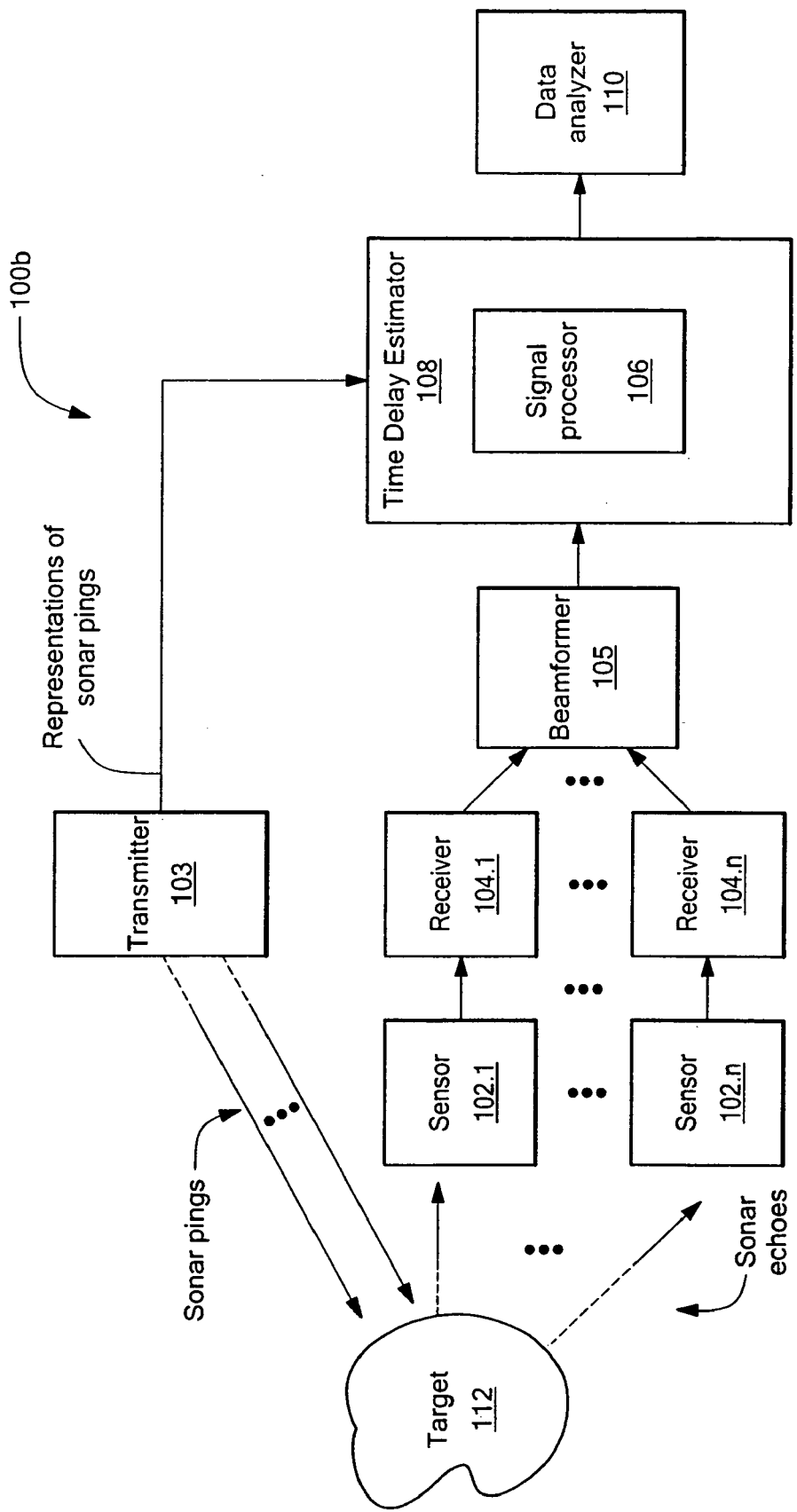

It was also described with reference to FIG. 1a that the receiver 104 provides the received signals directly to the time delay estimator 108. However, FIG. 1a merely depicts an illustrative embodiment of the system 100 and other alternative embodiments or variations may be made. For example, FIG. 1b depicts a system 100b that includes multiple receivers 104.1-104.n providing indications of received signals to a beamformer 105, which in turn provides beams to the time delay estimator 108. For example, the beamformer 105 included in the system 100b may be adapted to produce seismic sonar beams in a seismic sonar system.

It was also described that statistical estimates of time delay may be determined by calculating the mean or the mode of the distributions of time delay estimations. However, in alternative embodiments, statistical estimates of time delay may be determined by calculating the median of the distribution of time delay estimations. FIGS. 14b-14d depict illustrative peak variability curves 1410b-1410d resulting from calculations of the median of the time delay estimation distribution. Like the curves 1406b-1406d corresponding to the mode calculation, the accuracy breakpoints included in the curves 1410b-1410d are shifted to lower SNR values as the number of pings increases. However, the accuracy breakpoints included in the curves 1406b-1406d are shifted to lower SNR values than the breakpoints included in the curves 1410b-1410d, thereby indicating better noise resiliency for the mode calculation. FIG. 15 depicts a performance curve 1510 comprising a composite of the peak variability curves 1410b-1410d corresponding to the median calculation. As shown in FIG. 15, the calculation of the median of the distribution of time delay estimates obtained from multiple pings shifts the accuracy breakpoints to SNR levels that fall between the SNR levels obtained from the mean and mode calculations.

Increased accuracy in time delay estimation was also illustrated via improved discrimination of a target comprising a cylindrical container filled with different liquids such as fresh water, saline water, glycerol, or kerosene. It should be understood, however, that variations of this illustrative technique may be employed. For example, in the field of medical ultrasound, multiple pings may be transmitted toward a region of a patient's body to determine bone density. When each ping, penetrates the bone, a prominent feature such as the signal peak is maintained after being bounced from the front and the back of the bone. Two peaks can therefore be detected in successive echoes, and the time difference between the two peaks can be measured. Accordingly, the patient's bone density can be determined by analyzing the temporal differences between successive echoes.

Similarly, multiple pings may be transmitted toward the patient's heart to determine characteristics of the heart such as a heart wall thickness. When each ping penetrates the heart wall, a prominent feature such as the signal peak is maintained after being bounced from the front and the back of the heart wall, and the time difference between two signal peaks can be measured. Accordingly, the patient's heart wall thickness can be determined by analyzing the temporal differences between successive echoes. In addition, three dimensional representations of the patient's bones, heart, and any other suitable organ may be obtained by further application of this illustrative technique.

It was also described that the transmitter of the presently disclosed embodiment is configured to transmit one or more pings through a transmission medium such as water, and that the pings travel through the water until they strike an object or target in the water, which returns one or more echoes toward the sonar sensors. Because such targets typically comprise many substructures, multiple echoes are typically generated for each ping. It should be noted that the size of a window around each possible maximum of the envelope of an echo can be determined to distinguish between peaks representing a density change inside the target and spurious peaks resulting from noise. For example, the density change inside the target may correspond to layer penetration in geological exploration. When there is mutual movement between the transmitter/receiver and the target, such window determination has to be accomplished for multiple echoes from each pinging source separately. In one embodiment, such window determination is accomplished as follows.

First, motion estimation is applied for each set of echoes. The motion estimation is based on the assumption that the motion between the sensor array and the target is rigid, thereby utilizing all sensor recordings for each ping to determine the two dimensional displacement and rotation of the sensor array relative to the target. Because the sensor array is rigid, the same echo arriving at all of the sensors forms a noisy straight line in a plane defined by the sensor axis and an axis corresponding to the time of arrival of the echo at each of the sensors. The time of arrival or the peak energy falls roughly on a straight line due to noise. From the set of points, the properties of the line can be estimated, namely, the displacement from the origin and tilt. This corresponds to the motion estimation of the sonar for each ping. A transformation is then performed so that all lines corresponding to echoes from different pings fall on the same line. In this way, motion correction is achieved.

Next, each set of echoes resulting from a single ping is shifted to be aligned with echoes resulting from the other pings. When the properties of the line are estimated, the estimated tilt corresponds to the tilt of the sensor array relative to the target. Each set of echoes is shifted by shifting the time of arrival for each sensor based on a formula "ax+b", in which "x" corresponds to the sensor number 1, 2, etc., "a" corresponds to the tilt ratio, and "b" corresponds to a global shift of the sensor.

The analog mean of the energies of all signals is then calculated. This constitutes a first estimation of the sonar image from the multiple pings. It is noted that the mean signal is taken with respect to echoes resulting from different pings. For each ping, a time series is determined corresponding to the echoes. Such a time series is obtained at each sensor. The motion estimation and correction described above results in a shift in time of the time series, so that for all sensors the time series will be aligned, and for all pings the time series of each sensor will be aligned. Then, for each sensor, an average of energy over all pings is determined.

Next, a threshold is estimated from the analog mean image to determine a certain percentile of signal energy defining a window region around possible energy distribution peaks. Thus, for each sensor, there is a single time series corresponding to the average over the multiple pings. The standard deviation (STD) of the energy of the time series can then be calculated, and the threshold can be estimated to be about 3*STD. This threshold may be employed to define multiple windows around peaks that exceed 3*STD. The window width corresponds to the region around such peaks.

Based on the estimated threshold, temporal regions are then defined around each possible energy distribution peak. Finally, the median, the mode, or any other suitable statistical estimate is calculated from the distribution within each window region. The separation into such temporal windows constitutes a first phase of outliers removal for each peak determination.

It will be further appreciated by those of ordinary skill in the art that modifications to and variations of the above-described improved echo delay estimates from multiple sonar pings may be made without departing from the inventive concepts disclosed herein. Accordingly, the invention should not be viewed as limited except as by the scope and spirit of the appended claims.

What is claimed is:

1. A system for performing time delay estimation of signals propagating through an environment, comprising:
one or more sensors configured to receive a plurality of signals;
a time delay estimator operative to measure time delays between multiple pairs of the plurality of signals, thereby generating time delay estimation data from the measured time delays,
wherein at least some of the time delays between the multiple pairs of signals are measured at different points in time; and
a data analyzer operative to analyze the time delay estimation data, to generate a statistical distribution of the time delay estimates from the time delay estimation data, and to calculate at least one of the mean, the median, and the mode of the time delay estimation distribution,
wherein the statistical distribution of the time delay estimates comprises a plurality of bins, the plurality of bins including a central bin, and
wherein at least one first time delay estimate is associated with the central bin and multiple second time delay estimates are distributed among remaining ones of the bins.

2. The system of claim 1 wherein, in the event a degree of noise accompanies the multiple pairs of signals, at least some of the noise is non-correlated.

3. The system of claim 1 wherein the one or more sensors are configured to receive a plurality of successive signals including multiple pairs of successive signals.

4. The system of claim 3 wherein the time delay estimator comprises a passive time delay estimation system.

5. The system of claim 1 wherein the plurality of signals propagate through a predetermined transmission medium within the environment, the predetermined transmission medium being one of a fluid, the earth, and living tissue.

6. The system of claim 1 wherein the time delay estimator includes a signal processor operative to perform one or more preprocessing techniques on one or more of the plurality of signals to facilitate a determination of the temporal location of the one or more signals.

7. The system of claim 6 wherein the temporal location of the one or more signals corresponds to a prominent feature of the one or more signals, the prominent feature being one of a signal peak, a signal valley, a signal energy, and a signal zero crossing.

8. The system of claim 6 wherein the preprocessing techniques include at least one of a first technique including determining an absolute value of at least one of the plurality of signals, a second technique including match filtering at least one of the plurality of signals, and an instantaneous envelope detection technique.

9. The system of claim 1 wherein the multiple second time delay estimates are substantially uniformly distributed among remaining ones of the bins.

10. The system of claim 1 wherein the plurality of signals comprises one of sonar signals, seismic signals, ultrasonic signals, acoustic signals, and electromagnetic signals.

11. The system of claim 1 further including a beamformer configured to receive representations of the plurality of signals, and to provide beams corresponding to the plurality of signals to the time delay estimator.

12. A system for performing time delay estimation of signals propagating through an environment, comprising:
a transmitter configured to transmit multiple signals through the environment, wherein the transmitted signals travel through the environment until they strike at least one object, thereby generating multiple signals reflected from the object;
one or more sensors configured to receive the multiple reflected signals;
a time delay estimator operative to receive representations of the transmitted signals, to measure time delays between multiple pairs of signals, each pair comprising a respective reflected signal and a representation of a respective transmitted signal, thereby generating time delay estimation data from the measured time delays,
wherein at least some of the time delays between the multiple pairs of signals are measured at different points in time; and
a data analyzer operative to analyze the time delay estimation data, to generate a statistical distribution of the time delay estimates from the time delay estimation data, and to calculate at least one of the mean, the median, and the mode of the time delay estimation distribution,
wherein the statistical distribution of the time delay estimates comprises a plurality of bins, the plurality of bins including a central bin, and
wherein at least one first time delay estimate is associated with the central bin and multiple second time delay estimates are distributed among remaining ones of the bins.

13. The system of claim 12 wherein, in the event a degree of noise accompanies the reflected signals, at least some of the noise is non-correlated.

14. The system of claim 12 wherein the time delay estimator comprises an active time delay estimation system.

15. The system of claim 12 wherein each transmitted signal comprises a sonar ping, and each reflected signal comprises a sonar echo.

16. The system of claim 12 wherein the multiple transmitted signals propagate through a predetermined transmission medium within the environment, the predetermined transmission medium being one of a fluid, the earth, and living tissue.

17. The system of claim 12 wherein the time delay estimator includes a signal processor operative to perform one or more preprocessing techniques on one or more of the reflected signals to facilitate a determination of the temporal location of the one or more reflected signals.

18. The system of claim 17 wherein the temporal location of the one or more reflected signals corresponds to a prominent feature of the one or more reflected signals, the prominent feature being one of a signal peak, a signal valley, a signal energy, and a signal zero crossing.

19. The system of claim 17 wherein the preprocessing techniques include at least one of a first technique including determining an absolute value of at least one of the plurality of signals, a second technique including match filtering at least one of the plurality of signals, and an instantaneous envelope detection technique.

20. The system of claim 12 wherein the multiple second time delay estimates are substantially uniformly distributed among remaining ones of the bins.

21. The system of claim 12 wherein the plurality of signals comprises one of sonar signals, seismic signals, ultrasonic signals, acoustic signals, and electromagnetic signals.

22. A system for performing time delay estimation of signals propagating through an environment, comprising:

a transmitter configured to transmit multiple signals through the environment, wherein the transmitted signals travel through the environment until they strike at least one object, thereby generating multiple signals reflected from the object;

one or more sensors configured to receive the multiple reflected signals;

a time delay estimator operative to receive representations of the transmitted signals, to measure time delays between multiple pairs of signals, each pair comprising a respective reflected signal and a representation of a respective transmitted signal, thereby generating time delay estimation data from the measured time delays.

wherein at least some of the time delays between the multiple pairs of signals are measured & different points in time; and a beamformer configured to receive representations of the reflected signals, and to provide beams corresponding to the reflected signals to the time delay estimator.

23. A method of performing time delay estimation of signals propagating through an environment, comprising the steps of:

receiving a plurality of signals by one or more sensors;

measuring time delays between multiple pairs of the plurality of signals by a time delay estimator;

generating time delay estimation data from the measured time delays by the time delay estimator, wherein at least some of the time delays between the multiple pairs of signals are measured at different points in time;

analyzing the time delay estimation data by a data analyzer;

generating a statistical distribution of the time delay estimates from the time delay estimation data; and calculating at least one of the mean, the median, and the mode of the time delay, estimation distribution, wherein the statistical distribution of the time delay estimates comprises a plurality of bins, the plurality of bins including a central bin, and wherein at least one first time delay estimate is associated with the central bin and multiple second time delay estimates are distributed among remaining ones of the bins.

24. The method of claim 23 wherein, in the event a degree of noise accompanies the multiple pairs of signals, at least some of the noise is non-correlated.

25. The method of claim 23 wherein the receiving step includes receiving a plurality of successive signals including multiple pairs of successive signals.

26. The method of claim 25 wherein the time delay estimator comprises a passive time delay estimation system.

27. The method of claim 23 wherein the plurality of signals propagate through a predetermined transmission medium within the environment, the predetermined transmission medium being one of a fluid, the earth, and living tissue.

28. The method of claim 23 further including the step of performing one or more preprocessing techniques on one or more of the plurality of signals by a signal processor included in the time delay estimator, thereby facilitating a determination of the temporal location of the one or more signals.

29. The method of claim 28 wherein the temporal location of the one or more signals corresponds to a prominent feature of the one or more signals, the prominent feature being one of a signal peak, a signal valley, a signal energy, and a signal zero crossing.

30. The method of claim 28 wherein the preprocessing techniques include at least one of a first technique including determining an absolute value of at least one of the plurality of signals, a second technique including match filtering at least one of the plurality of signals, and an instantaneous envelope detection technique.

31. The method of claim 23 wherein the multiple second time delay estimates are substantially uniformly distributed among remaining ones of the bins.

32. The method of claim 23 wherein the plurality of signals comprises one of sonar signals, seismic signals, ultrasonic signals, acoustic signals, and electromagnetic signals.

33. The method of claim 23 further including the steps of receiving representations of the plurality of signals by a beamformer, and providing beams corresponding to the plurality of signals to the time delay estimator.

34. A method of performing time delay estimation of signals propagating through an environment, comprising the steps of:

transmitting multiple signals through the environment by a transmitter, wherein the transmitted signals travel through the environment until they strike at least one object, thereby generating multiple signals reflected from the object;

receiving the multiple reflected signals by one or more sensors;

receiving representations of the transmitted signals by a time delay estimator;

measuring time delays between multiple pairs of signals by the time delay estimator, each pair comprising a respective reflected signal and a representation of a respective transmitted signal;

generating time delay estimation data from the measured time delays by the time delay estimator, wherein at least some of the time delays between the multiple pairs of signals are measured at different points in time;

analyzing the time delay estimation data by a data analyzer;

generating a statistical distribution of the time delay estimates from the time delay estimation data; and calculating at least one of the mean, the median, and the mode of the time delay estimation distribution, wherein the statistical distribution of the time delay estimates comprises a plurality of bins, the plurality of bins including a central bin, and wherein at least one first time delay estimate is associated with the central bin and multiple second time delay estimates are distributed among remaining ones of the bins.

35. The method of claim 34 wherein, in the event a degree of noise accompanies the reflected signals, at least some of the noise is non-correlated.

36. The method of claim 34 wherein the time delay estimator comprises an active time delay estimation system.

37. The method of claim 34 wherein each transmitted signal comprises a sonar ping, and each reflected signal comprises a sonar echo.

38. The method of claim 34 wherein the multiple transmitted signals propagate through a predetermined transmission medium within the environment, the predetermined transmission medium being one of a fluid, the earth, and living tissue.

39. The method of claim 34 further including the step of performing one or more preprocessing techniques on one or more of the reflected signals by a signal processor included in the time delay estimator, thereby facilitating a determination of the temporal location of the one or more reflected signals.

40. The method of claim 39 wherein the temporal location of the one or more reflected signals corresponds to a prominent feature of the one or more reflected signals, the prominent feature being one of a signal peak, a signal valley, a signal energy, and a signal zero crossing.

41. The method of claim 39 wherein the preprocessing techniques include at least one of a first technique including determining an absolute value of at least one of the plurality of signals, a second technique including match filtering at least one of the plurality of signals, and an instantaneous envelope detection technique.

42. The method of claim 34 wherein the multiple second time delay estimates are substantially uniformly distributed among remaining ones of the bins.

43. The method of claim 34 wherein the plurality of signals comprises one of sonar signals, seismic signals, ultrasonic signals, acoustic signals, and electromagnetic signals.

44. A method of performing time delay estimation of signals propagating through an environment, comprising the steps of:

transmitting multiple signals through the environment by a transmitter, wherein the transmitted signals travel through the environment until they strike at least one object, thereby generating multiple signals reflected from the object;

receiving the multiple reflected signals by one or more sensors;

receiving representations of the transmitted signals by a time delay estimator;

measuring time delays between multiple pairs of signals by the time delay estimator, each pair comprising a respective reflected signal and a representation of a respective transmitted signal;

generating time delay estimation data from the measured time delays by the time delay estimator, wherein at least some of the time delays between the multiple pairs of signals are measured at different points in time;

receiving representations of the reflected signals by a beamformer; and providing beams corresponding to the reflected signals to the time delay estimator by the beamformer.

* * * * *

UNITED STATES PATENT AND TRADEMARK OFFICE
CERTIFICATE OF CORRECTION

| | |
|---|---|
| PATENT NO. | : 7,363,177 B2 |
| APPLICATION NO. | : 10/567887 |
| DATED | : April 22, 2008 |
| INVENTOR(S) | : Nathan Intrator et al. |

Page 1 of 1

It is certified that error appears in the above-identified patent and that said Letters Patent is hereby corrected as shown below:

Title page, item (54) the title should read as follows:

--APPARATUS AND METHOD FOR PERFORMING TIME DELAY ESTIMATION OF SIGNALS PROPAGATING THROUGH AN ENVIRONMENT--;

Column 1, lines 1-4, the title should read as follows:

--APPARATUS AND METHOD FOR PERFORMING TIME DELAY ESTIMATION OF SIGNALS PROPAGATING THROUGH AN ENVIRONMENT--;

Column 23, claim 22, line 13, "delays." should read --delays,--; and

Column 23, claim 22, line 15, "&" should read --at--.

Signed and Sealed this

Twenty-third Day of March, 2010

David J. Kappos
*Director of the United States Patent and Trademark Office*